(12) United States Patent
Zhang et al.

(10) Patent No.: US 12,449,333 B2
(45) Date of Patent: Oct. 21, 2025

(54) ODOR SNIFFING DEVICE AND VEHICLE-MOUNTED SECURITY INSPECTION APPARATUS FOR CONTAINER

(71) Applicants: NUCTECH COMPANY LIMITED, Beijing (CN); TSINGHUA UNIVERSITY, Beijing (CN)

(72) Inventors: Qingjun Zhang, Beijing (CN); Yuanjing Li, Beijing (CN); Zhiqiang Chen, Beijing (CN); Jianmin Li, Beijing (CN); Weiping Zhu, Beijing (CN); Ge Li, Beijing (CN); Nei Yang, Beijing (CN); Biao Cao, Beijing (CN); Wei Wang, Beijing (CN); Xiulin Ni, Beijing (CN); Shengxi Liu, Beijing (CN); Zheng Liang, Beijing (CN)

(73) Assignees: NUCTECH COMPANY LIMITED, Beijing (CN); TSINGHUA UNIVERSITY, Beijing (CN)

( * ) Notice: Subject to any disclaimer, the term of this patent is extended or adjusted under 35 U.S.C. 154(b) by 342 days.

(21) Appl. No.: 18/001,249

(22) PCT Filed: Jun. 7, 2021

(86) PCT No.: PCT/CN2021/098710
§ 371 (c)(1),
(2) Date: Dec. 8, 2022

(87) PCT Pub. No.: WO2021/249354
PCT Pub. Date: Dec. 16, 2021

(65) Prior Publication Data
US 2023/0236093 A1 Jul. 27, 2023

(30) Foreign Application Priority Data
Jun. 8, 2020 (CN) .......................... 202010512921.1

(51) Int. Cl.
*G01N 1/22* (2006.01)
*B25J 9/16* (2006.01)
(Continued)

(52) U.S. Cl.
CPC .......... *G01N 1/2211* (2013.01); *B25J 9/1697* (2013.01); *G01N 1/24* (2013.01);
(Continued)

(58) Field of Classification Search
CPC ........................... G01N 1/221; G01N 1/2211
(Continued)

(56) References Cited

U.S. PATENT DOCUMENTS 5,313,821 A * 5/1994 Bett .................. G01N 33/0031
73/863.23
5,859,362 A * 1/1999 Neudorfl ............ G01N 33/0047
73/23.2
(Continued)

FOREIGN PATENT DOCUMENTS

CN 108845054 A 11/2018
CN 109521081 A 3/2019
(Continued)

OTHER PUBLICATIONS

International Search Report and Written Opinion, with English translation, International Application No. PCT/CN2021/098710, mailed Aug. 27, 2011, 10 pages.

*Primary Examiner* — John Fitzgerald
(74) *Attorney, Agent, or Firm* — Knobbe, Martens, Olson & Bear, LLP

(57) ABSTRACT

Provided are an odor sniffing device (11) and a vehicle-mounted security inspection apparatus for a container (1). The odor sniffing device (11) includes a primary sampling front end (116), which has a vent adapter (116-1) having a shape matching with a vent of the ventilator of the container,
(Continued)

so that when the primary sampling front end (116) fits with the ventilator, the vent adapter (116-1) and the vent generally cooperate to achieve fluid communication. The vehicle-mounted security inspection apparatus (1) may perform imaging inspection and chemical inspection simultaneously.

18 Claims, 4 Drawing Sheets

(51) Int. Cl.
  G01N 1/24 (2006.01)
  G01N 30/20 (2006.01)
  G01N 30/72 (2006.01)
(52) U.S. Cl.
  CPC ....... G01N 30/20 (2013.01); *G01N 2030/201* (2013.01); *G01N 30/7206* (2013.01)
(58) Field of Classification Search
  USPC ........................................................ 73/28.04
  See application file for complete search history.

(56) References Cited

U.S. PATENT DOCUMENTS

| | | | | |
|---|---|---|---|---|
| 6,790,249 B2* | 9/2004 | Davies | ...................... | B08B 5/02 55/467 |
| 6,823,714 B2* | 11/2004 | Megerle | ............... | G01N 1/2211 73/23.2 |
| 7,100,424 B2* | 9/2006 | Wilson | ................. | G01N 1/2226 73/31.03 |
| 7,188,513 B2* | 3/2007 | Wilson | ................. | G01N 1/2226 73/864.81 |
| 7,390,465 B2* | 6/2008 | Swider | ................. | G01N 1/2205 436/1 |
| 7,483,511 B2* | 1/2009 | Bendahan | .............. | G01V 5/232 378/57 |
| 7,717,066 B2* | 5/2010 | Drolet | ................... | F04D 25/084 119/421 |
| 8,220,312 B2* | 7/2012 | Nacson | ................ | G01N 1/2226 73/31.03 |
| 8,881,574 B2* | 11/2014 | Saaski | .................. | G01N 1/2226 73/31.03 |
| 11,346,807 B2 | 5/2022 | Zhang et al. | | |
| 11,422,070 B2 | 8/2022 | Zhang et al. | | |
| 2003/0155506 A1* | 8/2003 | Motchkine | .............. | G01N 1/02 250/288 |
| 2006/0169025 A1* | 8/2006 | Wilson | ..................... | G01V 5/20 73/31.03 |
| 2009/0162196 A1* | 6/2009 | Drolet | ................... | A01K 15/02 415/224 |
| 2017/0138825 A1 | 5/2017 | Ornath | | |
| 2020/0209192 A1 | 7/2020 | Zhang et al. | | |
| 2021/0048376 A1 | 2/2021 | Zhang et al. | | |
| 2021/0055267 A1 | 2/2021 | Zhang et al. | | |
| 2021/0404988 A1 | 12/2021 | Zhang et al. | | |

FOREIGN PATENT DOCUMENTS

| | | | |
|---|---|---|---|
| CN | 109521482 A | | 3/2019 |
| CN | 209559837 U | | 10/2019 |
| CN | 110880445 A | | 3/2020 |
| CN | 111337598 A | | 6/2020 |
| CN | 112433259 A | | 3/2021 |
| CN | 112444555 A | | 3/2021 |
| JP | 2018500535 A | * | 1/2018 |
| WO | WO-9938015 A1 | * | 7/1999 ......... G01N 33/0011 |

* cited by examiner

ODOR SNIFFING DEVICE AND VEHICLE-MOUNTED SECURITY INSPECTION APPARATUS FOR CONTAINER

CROSS-REFERENCE TO RELATED APPLICATION

This application is a Section 371 National Stage Application of International Application No. PCT/CN2021/098710, filed on Jun. 7, 2021, entitled "ODOR SNIFFING DEVICE AND VEHICLE-MOUNTED SECURITY INSPECTION APPARATUS FOR CONTAINER", which is incorporated herein by reference in its entirety which claims priority to Chinese patent Application No. 202010512921.1, filed on Jun. 8, 2020, the content of which are incorporated herein by reference in their entirety.

TECHNICAL FIELD

The present disclosure relates to a field of security check, and in particular, to an odor sniffing device and a vehicle-mounted security inspection apparatus for a container.

BACKGROUND

Conventional container/vehicle inspection systems typically use fluoroscopy or backscatter imaging, and rely on X-ray to penetrate an inspected object or backscatter X-ray to obtain internal and surface information of the inspected object. However, in an actual on-site inspection, it is impossible to accurately determine substance properties of low atomic number substances such as volatile toxic and harmful substances, flammable and explosive hazardous chemicals, drugs, explosives, etc. in a container by relying only on an X-ray fluoroscopy image or a backscatter image. Photoionization, infrared, microbalance, surface acoustic wave, ion mobility spectroscopy and the like are very suitable for rapid detection of toxic and harmful gases, chemical warfare agents and flammable and explosive dangerous chemicals.

The ion mobility spectroscopy technology is a detection technology under atmospheric pressure environment, has the characteristics of sensitivity, quick response and the like, and may complete the detection and identification of simple chemical components in a very short time. In recent years, the ion mobility spectrometry technology has been heavily equipped by customs, airports, etc., and mainly used for the detection of drugs and explosives. Gas chromatograph is a highly efficient and stable separation tool, which is widely used in separation analysis and quantitative detection of gas phase substances.

A combination of gas chromatography and ion mobility spectroscopy (GC-IMS) may not only implement separation and analysis of mixed complex chemical components, but also detect and determine the content of each component, which is very suitable for detecting toxic and harmful gases, mixed explosives, drugs and other contraband in complex environments.

The existing detection technologies have insufficient resolving ability for complex components, or a detection time is long, which makes it difficult to take into account both complex detection environment and rapid and accurate detection requirements of complex detected objects on site, and also difficult to achieve a requirement of quantitative detection.

SUMMARY

Embodiments of the present disclosure provide an odor sniffing device configured to perform an inspection by sniffing gas and/or particulate matter in an inspected object, wherein the odor sniffing device includes:

a primary sampling front end configured to be accessible to a ventilator of a container and provide a suction force so that the primary sampling front end collects gas and/or particles inside the container;

wherein the primary sampling front end has a vent adapter having a shape matching with a vent of the ventilator of the container, so that when the primary sampling front end fits with the ventilator, the vent adapter and the vent cooperate to achieve fluid communication.

In an embodiment, the odor sniffing device includes: a cyclone concentration sampler defining a cyclone chamber and including opposing first and second ends, a size of the cyclone chamber decreasing gradually from the first end to the second end; and a primary sampling pipeline being at least in fluid communication with the primary sampling front end and the cyclone concentration sampler;

wherein the cyclone concentration sampler includes:

a first inlet of the cyclone chamber at an end face of the first end, configured to be connected with the primary sampling front end through a portion of the primary sampling pipeline, and to introduce the gas and/or particulate matter collected by the primary sampling front end into the cyclone chamber, wherein the gas discharged from the first inlet of the cyclone chamber is enabled for forming a cyclone airflow flowing from the first end to the second end in the cyclone chamber;

a first outlet of the cyclone chamber at the second end configured to allow at least a portion of the gas and/or particulate matter in the cyclone chamber to be discharged from the first outlet of the cyclone chamber; and a sample gas outlet of the cyclone chamber located near a side wall of the second end, configured to allow at least a portion of the gas and/or particulate matter to be discharged from the sample gas outlet of the cyclone chamber, wherein the sample gas outlet of the cyclone chamber is closer to the first end than the first outlet of the cyclone chamber.

In an embodiment, the first inlet of the cyclone chamber blows gas downward in a direction of the first end of the cyclone chamber toward the second end.

In an embodiment, the first inlet of the cyclone chamber is arranged in a substantially central position of the first end of the cyclone chamber.

In an embodiment, the cyclone concentration sampler further includes a second outlet of the cyclone chamber located on the side wall and close to the first end, configured to allow at least a portion of the gas and/or particulate matter in the cyclone chamber to be discharged from the second outlet of the cyclone chamber.

In an embodiment, the cyclone chamber of the cyclone concentration sampler has a substantially tapered three-dimensional shape, wherein the cyclone chamber has a first tapered part close to the first end and a second tapered part close to the second end, an angle between side walls on two sides of the second tapered part is greater than an angle between side walls on two sides of the first tapered part.

In an embodiment, a size of the first tapered part is larger than a size of the second tapered part in an extension direction from the first end of the cyclone concentration sampler to the second end of the cyclone concentration sampler.

In an embodiment, the sample gas outlet of the cyclone chamber is arranged on a side wall of the second tapered part of the cyclone concentration sampler, a sample in the cyclone airflow is discharged through the sample gas outlet of the cyclone chamber, and the first outlet of the cyclone chamber is at a top of a cone of the second tapered part.

In an embodiment, the primary sampling pipeline includes:
- a four-way valve of the primary sampling pipeline, wherein the first outlet of the cyclone chamber and a second outlet of the cyclone chamber are respectively connected with a first port and a second port of the four-way valve of the primary sampling pipeline; and
- a diaphragm pump connected with a third port of the four-way valve of the primary sampling pipeline through a ninth two-position three-way valve, wherein the diaphragm pump is configured to drive a gas flow in the primary sampling pipeline;
- wherein a fourth port of the four-way valve of the primary sampling pipeline is connected with an external environment.

In an embodiment, the primary sampling pipeline includes a three-way valve of the primary sampling front end, wherein a first port of the three-way valve of the primary sampling front end is connected to the primary sampling front end, and a second port of the three-way valve of the primary sampling front end is connected to the first inlet of the cyclone chamber, a third port of the three-way valve of the primary sampling front end is connected to a diaphragm pump through an eighth two-position three-way valve, wherein when the eighth two-position three-way valve is in position 1, the diaphragm pump is in fluid communication with the three-way valve of the primary sampling front end through a first port of the eighth two-position three-way valve, and when the eighth two-position three-way valve is in position 0, the diaphragm pump is in communication with an outside through a second port of the eighth two-position three-way valve.

In an embodiment, the odor sniffing device is configured to be:
- operable in a primary sampling mode, wherein the eighth two-position three-way valve is in position 0, a ninth two-position three-way valve is in position 1, the diaphragm pump operates to generate a suction force in the primary sampling pipeline, the primary sampling front end sucks gas and/or particles inside the container, the sucked gas and/or particles enter the cyclone concentration sampler, a cyclone running from the first end to the second end is generated in the cyclone chamber, and a portion of the gas is discharged from the sample gas outlet of the cyclone chamber and sent to a downstream gas path; or
- operable in a primary suspension mode, wherein the diaphragm pump continues to operate, the eighth two-position three-way valve is in position 0, and the ninth two-position three-way valve is in position 0, or the diaphragm pump is suspended; or
- operable in a primary cleaning mode, wherein the eighth two-position three-way valve is in position 1, the ninth two-position three-way valve is in position 0, the diaphragm pump operates to generate a suction force in the primary sampling pipeline, external air is sucked in through a second port of the ninth two-position three-way valve, and is sent to the primary sampling front end through the primary sampling pipeline for discharge, so as to clean a portion of the primary sampling pipeline and the primary sampling front end, or the eighth two-position three-way valve is in position 1, the ninth two-position three-way valve is in position 1, and external air is sucked into the primary sampling pipeline through the fourth port of the four-way valve of the primary sampling pipeline, so as to clean the cyclone concentration sampler and a portion of the primary sampling pipeline.

In an embodiment, the odor sniffing device further includes a flow regulator arranged between the fourth port of the four-way valve of the primary sampling pipeline and the external environment to control a flow of external gas entering the primary sampling pipeline; the odor sniffing device is operated in the primary cleaning mode, the eighth two-position three-way valve is in position 1, and the ninth two-position three-way valve is in position 1, the flow regulator regulates the flow of external gas entering the primary sampling pipeline to maintain a positive pressure in the primary sampling pipeline.

In an embodiment, the odor sniffing device further includes a secondary gas phase detection section including:
- a secondary sampling gas path including a sampling port for collecting a sample gas, a first sample tube and a second sample tube for storing the collected sample gas;
- an ion migration tube which may be used, for example, to detect the composition of the sample gas, and may, for example, include a sample injection inlet for the sample gas and carrier gas to flow in, a gas outlet for the gas to flow out, and a migration gas inlet for the migration gas to flow in;
- a secondary sample injection gas path being in fluid communication with the secondary sampling gas path and the ion migration tube, so that the sample gases stored in the first sample tube and/or the second sample tube are respectively introduced into the downstream ion migration tube; and
- a secondary valve assembly configured to allow the sample gas to be introduced into the first sample tube and/or the second sample tube in a sampling state, and allow the sample gas to be introduced into the ion migration tube from the first sample tube and/or the second sample tube in a sample injection state.

In an embodiment, the secondary gas phase detection section further includes a gas chromatographic column arranged upstream of the ion migration tube in the secondary sample injection gas path in a gas injection direction, so that the sample gas from one of the first sample tube and the second sample tube passes through the gas chromatographic column first, and then is sent to the ion migration tube.

In an embodiment, the secondary valve assembly includes a first two-position three-way valve and a second two-position three-way valve; the first sample tube is arranged between the first two-position three-way valve and the second two-position three-way valve, wherein when the first two-position three-way valve is in position 1, a first port of the first two-position three-way valve is in fluid communication with the sampling port, and when the second two-position three-way valve is in position 1, gas is discharged through a first port of the second two-position three-way valve; and
the secondary valve assembly includes a third two-position three-way valve and a fourth two-position three-way valve; the second sample tube is arranged between the third two-position three-way valve and the fourth two-position three-way valve, wherein when the third two-position three-way valve is in position 1, a first port of the third two-position three-way valve is in fluid communication with the sampling port, and when the fourth two-position three-way valve is in position 1, gas is discharged through a first port of the fourth two-position three-way valve.

In an embodiment, the secondary valve assembly includes a first two-position three-way valve and a second two-position three-way valve; the first sample tube is arranged between the first two-position three-way valve and the second two-position three-way valve, wherein when the first two-position three-way valve is in position 0, a second port of the first two-position three-way valve is in fluid communication with the secondary sample injection gas path to receive the gas of the secondary sample injection gas path, and when the second two-position three-way valve is in position 0, a second port of the second two-position three-way valve is in fluid communication with the secondary sample injection gas path through to send the sample gas into the secondary sample injection gas path; and the secondary valve assembly includes a third two-position three-way valve and a fourth two-position three-way valve; the second sample tube is arranged between the third two-position three-way valve and the fourth two-position three-way valve, wherein when the third two-position three-way valve is in position 0, a second port of the third two-position three-way valve is in fluid communication with the secondary sample injection gas path to receive the gas in the secondary sample injection gas path, and when the fourth two-position three-way valve is in position 0, a second port of the fourth two-position three-way valve is in fluid communication with the secondary sample injection gas path to send the sample gas into the secondary sample injection gas path.

In an embodiment, the sample injection inlet of the ion migration tube includes a first sample injection inlet, wherein the secondary sample injection gas path sends the sample gas from the second two-position three-way valve to the first sample injection inlet of the ion migration tube, so as to conduct detection through the ion migration tube; and the sample injection inlet of the ion migration tube further includes a second sample injection inlet, wherein the secondary sample injection gas path sends the sample gas from the fourth two-position three-way valve to a gas chromatographic column for detection, and then the sample gas is discharged from the gas chromatographic column, and is introduced into the second sample injection inlet through the secondary sample injection gas path to enter the ion migration tube for detection.

In an embodiment, the secondary gas phase detection section further includes a fifth two-position three-way valve, and when the fifth two-position three-way valve is in position 1, a first port of the fifth two-position three-way valve is in communication with the second port of the third two-position three-way valve, and when the fifth two-position three-way valve is in position 0, a fluid communication between the secondary sample injection gas path and the third two-position three-way valve is disconnected.

In an embodiment, the secondary gas phase detection section further includes a sixth two-position three-way valve arranged in the secondary sample injection gas path; when the sixth two-position three-way valve is in position 1, the sixth two-position three-way valve receives the gas from the fourth two-position three-way valve and sends the gas to the gas chromatographic column through a first port of the sixth two-position three-way valve, and when the sixth two-position three-way valve is in position 0, a gas path to the gas chromatographic column is disconnected, a second port of the sixth two-position three-way valve is connected to the outside through a filter.

In an embodiment, the secondary gas phase detection section further includes a second three-way arranged between the sixth two-position three-way valve and the gas chromatographic column, wherein the second three-way is connected with the sixth two-position three-way valve, the gas chromatographic column and the second port of the fifth two-position three-way valve.

In an embodiment, the secondary gas phase detection section further includes a chromatographic booster pump arranged upstream of the fifth two-position three-way valve, wherein when the fifth two-position three-way valve is in position 0, the gas is driven to enter the gas chromatographic column along the sample injection gas path and is boosted.

In an embodiment, the secondary sampling gas path further includes a sampling pump and a seventh two-position three-way valve, wherein the sampling pump is connected with the seventh two-position three-way valve, the seventh two-position three-way valve is connected with the first two-position three-way valve and the second two-position three-way valve through a first three-way, so that the seventh two-position three-way valve is in position 0, and the first sample tube and/or the second sample tube are allowed to be in fluid communication with the sampling pump, enabling the sampling pump to drive the sampling port to draw the sample to the first sample tube and/or the second sample tube.

In an embodiment, a secondary valve assembly includes a first filter configured to filter a gas flowing through the first filter, and allow the gas to enter a secondary sampling gas path through the first filter, enabling a sampling pump to reversely drive the gas filtered by the filter to flow into a first sample tube and/or a second sample tube through the seventh two-position three-way valve, and then discharge the gas from a sampling port.

In an embodiment, the secondary gas phase detection section further includes an online internal calibration gas path, wherein the online internal calibration gas path includes a calibrator container providing a calibrator and a calibration solenoid valve connecting the calibrator container to the secondary sample injection gas path; the calibration solenoid valve is configured to provide a trace calibrator to the secondary sample injection gas path through an on-off operation during a detection process of the secondary gas phase detection section.

In an embodiment, the secondary gas phase detection section further includes an internal circulation gas path, so that at least a portion of the gas discharged from a gas outlet of the ion migration tube is sent back to a migration gas inlet of the ion migration tube by the internal circulation gas path;

at least a portion of the gas discharged from a gas outlet of the ion migration tube is returned to the second port of the first two-position three-way valve by a first secondary sample injection gas path branch of the secondary sample injection gas path and/or returned to the second port of the third two-position three-way valve by a second secondary sample injection gas path branch of the secondary sample injection gas path.

In an embodiment, the internal circulation gas path includes a first buffer chamber, a second buffer chamber, and a circulating drive pump arranged between the first buffer chamber and the second buffer chamber; the first buffer chamber receives the gas discharged from the ion migration tube and absorbs a vibration caused by the gas; the gas discharged from the first buffer chamber flows to the second buffer chamber under an action of the circulating drive pump, one part of the gas discharged from the second buffer chamber circulates in the internal circulation gas path as the migration gas of the ion migration tube, and the other part of the gas discharged from the second buffer chamber enters the secondary sample injection gas path.

In an embodiment, the first sample tube and the second sample tube are configured to have a set fixed volume.

In an embodiment, when the odor sniffing device is operated in a first detection mode, the sampling port is close to a detected target, the first two-position three-way valve and the second two-position three-way valve are in position 1, and the sample gas is collected through the sampling port and enters the first sample tube; then the first two-position three-way valve and the second two-position three-way valve are switched to position 0, and the gas in the secondary sample injection gas path drives the sample gas in the first sample tube to enter the ion migration tube for detection; or when the odor sniffing device is operated in in a second detection mode, the sampling port is close to a detected target, the third two-position three-way valve and the fourth two-position three-way valve are in position 1, and the sample gas is collected through the sampling port and enters the second sample tube; then the third two-position three-way valve and the fourth two-position three-way valve are switched to position 0, and the gas in the secondary sample injection gas path drives the sample gas in the second sample tube into the gas chromatographic column, and then into the ion migration tube for detection; or when the odor sniffing device is operated in a third detection mode, the sampling port is close to a detected target, the first two-position three-way valve, the second two-position three-way valve, the third two-position three-way valve, and the fourth two-position three-way valve are in position 1, and the sample gas is collected through the sampling port and enters the first sample tube and the second sample tube respectively; then the first two-position three-way valve and the second two-position three-way valve are switched to position 0, and the gas in the secondary sample injection gas path drives the sample gas of the first sample tube to enter the ion migration tube for detection to determine whether the sample gas contains a suspect substance, and if the sample gas of the first sample tube is detected by the ion migration tube as not containing a suspect substance, the third two-position three-way valve, the fourth two-position three-way valve, and the sixth two-position three-way valve are switched to position 0 to discharge the sample gas from the second sample tube; or when the odor sniffing device is operated in a fourth detection mode, if the sample gas of the first sample tube is detected by the ion migration tube as containing a suspect substance, the sixth two-position three-way valve is switched to position 1, so that the sample gas from the second sample tube is driven into the gas chromatographic column, and then into the ion migration tube for quantitative detection.

In an embodiment, the secondary gas phase detection section is configured to present detection results on a same spectrogram based on a time difference between a detection of the sample gas by the ion migration tube and a detection of the sample by the gas chromatography column—ion migration tube, so as to comprehensively determine the detection results.

The present disclosure further provides a vehicle-mounted security inspection apparatus for a container, including:
a vehicle;
an imaging inspection section mounted on the vehicle and configured to perform an inspection on a to-be-inspected object in an imaging manner;
a robot arm mounted on the imaging inspection section; and
the odor sniffing device above mentioned, wherein the primary sampling front end of the odor sniffing device is mounted on the robot arm;
wherein the robot arm enables the primary sampling front end to access to a ventilator of a container, so as to extract gas and/or particles inside the container from the ventilator.

In an embodiment, the vehicle-mounted security inspection apparatus further includes an intelligent identification device based on a camera device, configured to collect an image of the container and a surrounding environment, and use an intelligent algorithm to locate a position of the ventilator of the container by automatically identifying the collected image of the container, so as to control the robot arm to position the primary sampling front end on the ventilator of the container for sampling.

In an embodiment, the vehicle-mounted security inspection apparatus further includes an air or wind knife purging device configured to gas-purge the ventilator of the container and an adjacent surface of the ventilator of the container for dust removal and moisture removal before an end portion of the robot arm is brought into proximity with the ventilator of the container.

DETAILED DESCRIPTION OF EMBODIMENTS

While the present disclosure allows various modifications and alternative forms, specific embodiments are shown in the accompanying drawings by way of example, and will be described in detail herein. However, it should be understood that the accompanying drawings and detailed description thereto are not intended to limit the present disclosure to the specific form disclosed, but on the contrary, to cover all modifications, equivalent forms and alternative forms falling into the spirit and scope of the present disclosure defined by the appended claims. The accompanying drawings are for illustrative purposes and are not drawn to scale.

In the existing container or vehicle inspection technology, an operator needs to hold a sampling port and insert a sampling probe into a container from a container door slot for air suction sampling when detecting whether there are toxic and harmful gases/dangerous chemicals in the container. On the one hand, the sampling is tedious, time-consuming, labor-consuming, and may not be intelligent, and may cause harm to the operator. On the other hand, forced sampling at the door slot of the container may damage the sampling probe or the waterproof performance of the container.

Figure 2A:
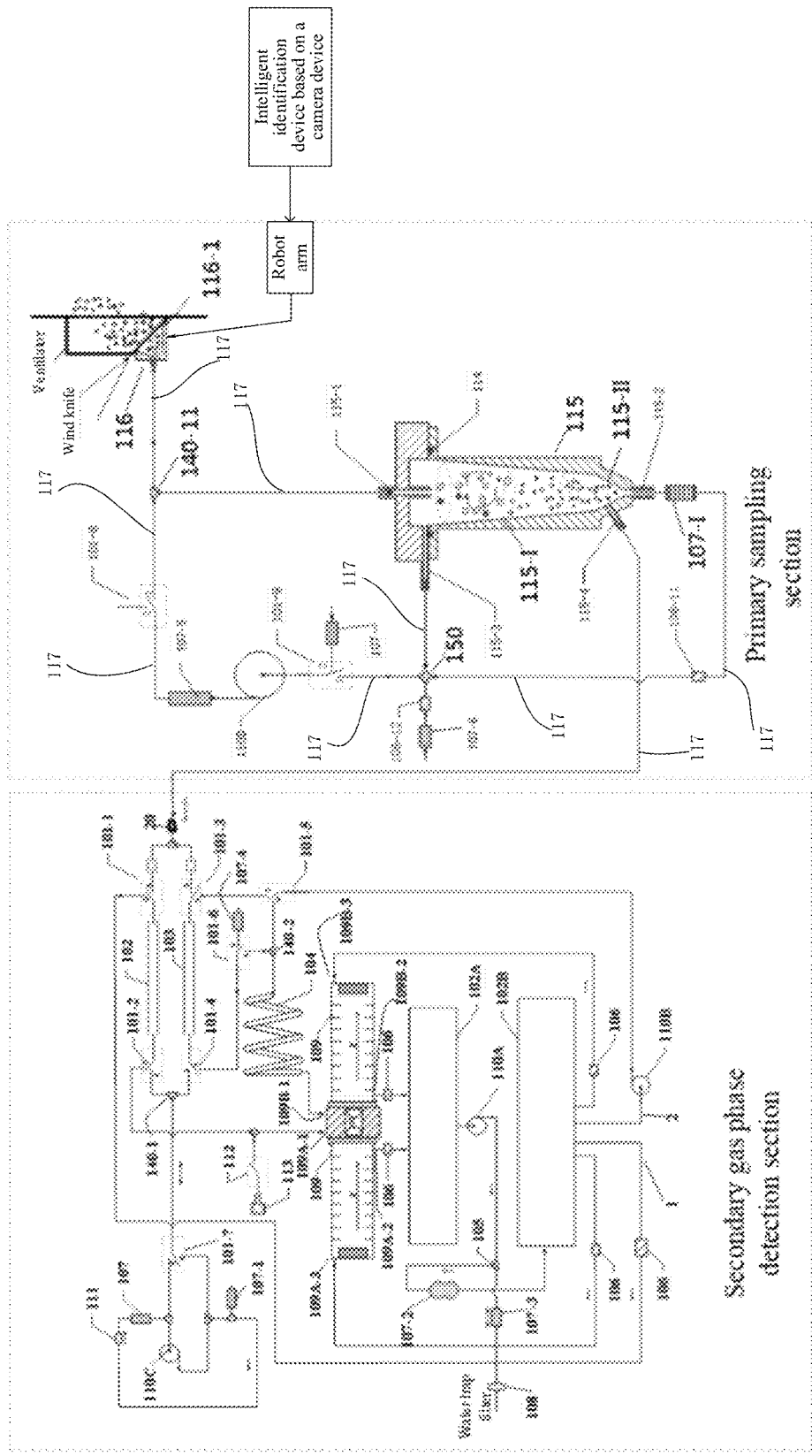
FIG. 2A shows a schematic diagram of an odor sniffing device according to an embodiment of the present disclosure, the odor sniffing device is schematically divided into a primary sampling section and a secondary gas phase detection section through a dotted line frame.

Embodiments of the present disclosure provide an odor sniffing device 11 configured to perform an inspection by sniffing gas and/or particulate matter in an inspected object. As shown in FIG. 2A, the odor sniffing device 11 includes a primary sampling front end 116 configured to be accessible to a ventilator of a container and provide a suction force so that the primary sampling front end 116 collects gas and/or particles inside the container. The primary sampling front end 116 has a vent adapter 116-1 having a shape matching with a vent of the ventilator of the container, so that when the primary sampling front end 116 fits with the ventilator, the vent adapter 116-1 and the ventilator may generally cooperate to achieve fluid communication. As shown in FIG. 2A, the ventilator of the container is schematically shown as an opening with a slope, and the vent adapter 116-1 has a corresponding slope to cooperate with the opening of the ventilator of the container. A container ventilator sampling device applicable to container security inspection is designed to collect an odor of toxic and harmful gases/dangerous chemicals inside a container at the container ventilator without damaging the container and the sampling probe.

In an embodiment, the odor sniffing device 11 includes a cyclone concentration sampler 115 defining a cyclone chamber and including opposite first and second ends, a size of the cyclone chamber decreasing gradually from the first end to the second end; and a primary sampling pipeline 117 being at least in fluid communication with the primary sampling front end 116 and the cyclone concentration sampler 115. In the odor sniffing device 11 shown in FIG. 2A, the first end of the cyclone concentration sampler 115 is at the top and the second end of the cyclone concentration sampler 115 is at the bottom. However, it should be known that the cyclone concentration sampler 115 may be placed obliquely. The cyclone chamber defined by the cyclone concentration sampler 115 may be tapered, or approximately conical. A shell of the cyclone concentration sampler 115 may be cylindrical or conical, and the shape is not limited.

Figure 2B:
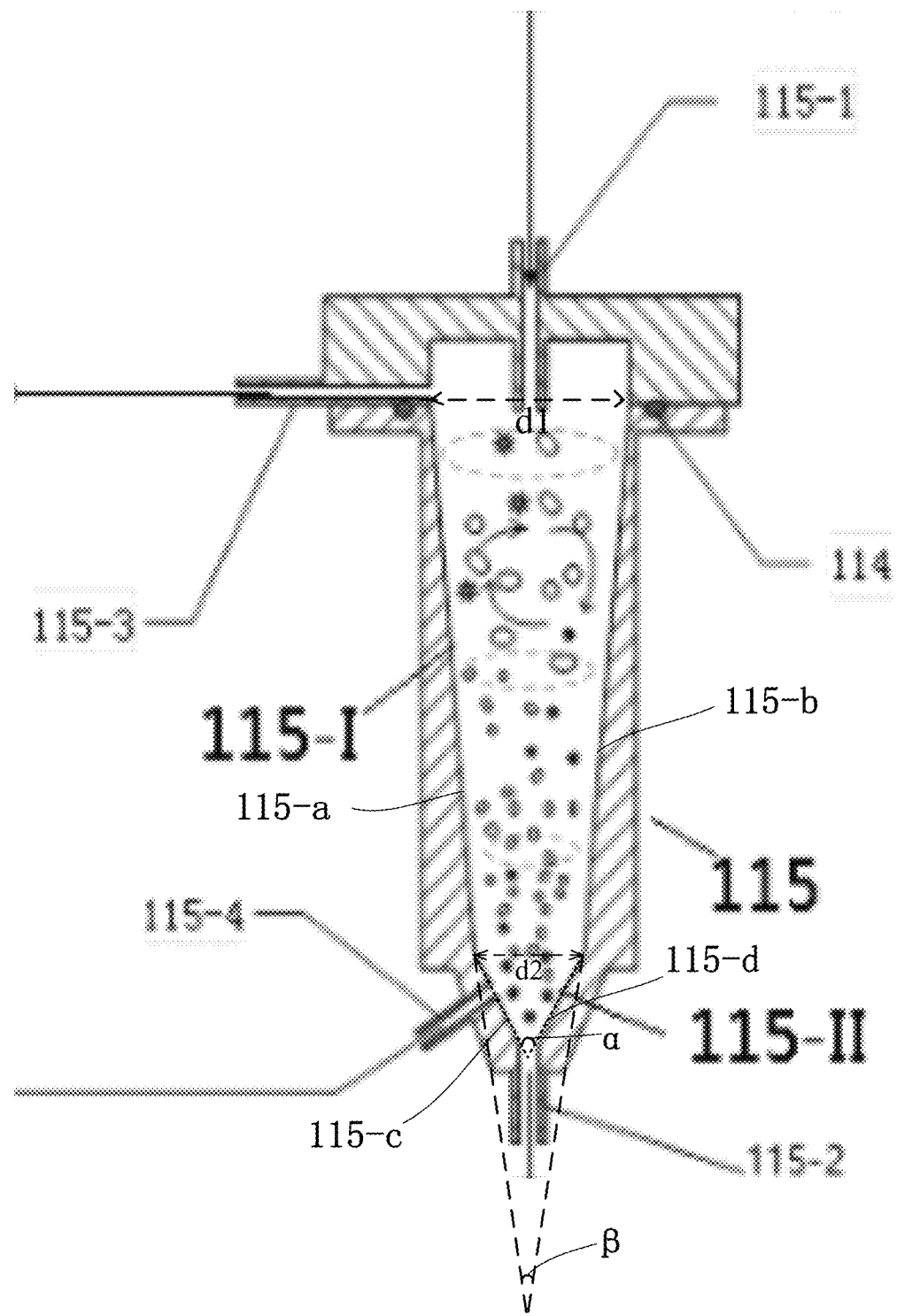
FIG. 2B shows a schematic diagram of a cyclone concentration sampler according to an embodiment of the present disclosure.

In an embodiment, the cyclone concentration sampler 115 includes: a first inlet 115-1 of the cyclone chamber at an end face of the first end, configured to be in fluid communication with the primary sampling front end 116 through a portion of the primary sampling pipeline 117, and to introduce the gas and/or particulate matter collected by the primary sampling front end 116 into the cyclone chamber. The gas discharged from the first inlet 115-1 of the cyclone chamber may form a cyclone airflow flowing from the first end to the second end in the cyclone chamber. FIG. 2A shows a sectional view of the cyclone concentration sampler 115; the first inlet 115-1 of the cyclone chamber is located at a center of the end face of the first end; and experiments show that a cyclone may still be formed at this point. However, the first inlet 115-1 of the cyclone chamber may also be located near an edge of the end face of the first end. At this point, an airflow blown into the cyclone chamber from the first inlet 115-1 of the cyclone chamber may form a cyclone in the cyclone chamber. The first inlet 115-1 of the cyclone chamber may be vertical and in an axis direction of the cyclone chamber (in a direction where the first end of the cyclone chamber faces the second end), or may form an angle with the axis direction of the cyclone chamber (an arrangement shown in FIGS. 2A-2B is not intended to limit a position and orientation of the first inlet 115-1 of the cyclone chamber). Here, the end face of the first end of the cyclone concentration sampler 115 is a plane, and the opposite end of the first end of the cyclone concentration sampler 115 is a second end. The second end may have a certain area, that is, it may be a plane. However, in an embodiment, the second end may be a tip.

In embodiments of the present disclosure, the cyclone concentration sampler 115 further includes a first outlet 115-2 of the cyclone chamber at the second end, configured to allow at least a portion of the gas and/or particulate matter in the cyclone chamber to be discharged from the first outlet 115-2 of the cyclone chamber. When the second end is a planar end, the first outlet 115-2 of the cyclone chamber is located in the center of the second end. When the second end is a tip, the second end of the cyclone concentration sampler 115 may be regarded as an opening, i.e., the first outlet 115-2 of the cyclone chamber. According to embodiments of the present disclosure, the airflow blown into the cyclone chamber from the first inlet 115-1 of the cyclone chamber may form a cyclone in the cyclone chamber, and the cyclone flows rotationally from the first end to the second end, and flows out from the first outlet 115-2 of the cyclone chamber. The cyclone concentration sampler 115 further includes a sample gas outlet 115-4 of the cyclone chamber located near the second end. The sample gas outlet 115-4 of the cyclone chamber is located on the side wall near the second end. The side wall is a side wall relative to the end, that is, the sample gas outlet 115-4 of the cyclone chamber is not on the end face of the second end (if the second end is the planar end). The sample gas outlet 115-4 of the cyclone chamber is configured to allow at least a portion of the gas and/or particulate matter in the cyclone chamber to be discharged from the sample gas outlet 115-4 of the cyclone chamber, wherein the sample gas outlet 115-4 of the cyclone chamber is closer to the first end than the first outlet 115-2 of the cyclone chamber. In FIG. 2A, the sample gas outlet 115-4 of the cyclone chamber is close to the first outlet 115-2 of the cyclone chamber, the first outlet 115-2 of the cyclone chamber is at the second end at the bottom, and the sample gas outlet 115-4 of the cyclone chamber is in the side wall near the second end.

In the embodiment shown in FIGS. 2A-2B, the cyclone chamber of the cyclone concentration sampler 115 has a substantially tapered three-dimensional shape. It may be seen that the cyclone chamber has a first tapered part 115-I close to the first end and a second tapered part 115-II close to the second end. An angle $\alpha$ between side walls **115-*c*, 115-*d* on two sides of the second tapered part 115-II is greater than an angle $\beta$ between side walls 115-*a*, 115-*b* on two sides of the first tapered part 115-I. That is, a wall inclination of an upper part of the cyclone chamber is smaller than a wall inclination of a lower part of the cyclone chamber close to the second end. When the cyclone runs to the second tapered part 115-II, due to an increase of the wall inclination, a rotational flow speed of the cyclone increases, and a centrifugal force of the gas increases. At this point, the sample gas outlet 115-4 of the cyclone chamber is set in the wall of the second tapered part 115-II, the sample in the gas flows out of the sample gas outlet 115-4 of the cyclone chamber due to the centrifugal force, while heavier particles or dust or other unwanted substances are not thrown out from the sample gas outlet 115-4 of the cyclone chamber by gravity, and thus continue to fall into the second end and are discharged with the gas from the first outlet 115-2 of the cyclone chamber. In the embodiment shown in FIGS. 2A-2B, in an extension direction from the first end of the cyclone concentration sampler 115 to the second end of the cyclone concentration sampler 115, a size (e.g., basal diameter d1) of the first tapered part 115-I is larger than a size (e.g., basal diameter d2) of the second tapered part 115**-II.

In the above embodiment shown in FIGS. 2A-2B, in a vertical direction, the size (e.g., basal diameter d1) of the first tapered part 115-I is larger than the size (e.g., basal diameter d2) of the second tapered part 115-II, thus more gas is contained in the first tapered part 115-I. The inclination of the wall of the second tapered part 115-II relative to the wall of the first tapered part 115-I increases, thus a speed of gas rotation in the second tapered part 115-II is accelerated, and a volume of the second tapered part 115-II decreases. When the gas rotated in the first tapered part 115-I runs into the second tapered part 115-II, the gas will be compressed, and the sample gas may be extracted through the sample gas outlet 115-4 of the cyclone chamber.

In an embodiment, the cyclone concentration sampler 115 further includes a second outlet 115-3 of the cyclone chamber located on the side wall and close to the first end, configured to allow at least a portion of the gas and/or particulate matter in the cyclone chamber to be discharged from the second outlet of the cyclone chamber. Providing the second outlet 115-3 of the cyclone chamber may keep a pressure in the cyclone chamber in balance, so that an internal pressure of the whole cyclone chamber is at a desired set value, so that the cyclone speed in the cyclone chamber is at the desired value, and the sample may be extracted from the sample gas outlet 115-4 of the cyclone chamber. However, it should be understood that in other embodiments, the cyclone concentration sampler 115 may not include the second outlet 115-3 of the cyclone chamber, and the sample may be extracted from the sample gas outlet 115-4 of the cyclone chamber by adjusting a pressure in the primary sampling pipeline 117. In the above embodiments, the second outlet 115-3 of the cyclone chamber is not necessary, that is, when the second outlet 115-3 of the cyclone chamber is not provided, the cyclone, the gas circulation of the primary sampling gas path and the filtration of pollutants such as particles may be implemented through the first inlet 115-1 of the cyclone chamber, the first outlet 115-2 of the cyclone chamber and the sample gas outlet 115-4 of the cyclone chamber. If the second outlet 115-3 of the cyclone chamber is further provided, the performance of the cyclone concentration sampler 115 will be further improved. The pressure in the cyclone chamber may be kept in balance, so that the internal pressure of the whole cyclone chamber is at the desired set value, thereby causing the cyclone speed in the cyclone chamber to be at the desired value.

In an embodiment, the primary sampling pipeline 117 includes: a four-way valve 150 of the primary sampling pipeline 117, wherein the first outlet 115-2 of the cyclone chamber and the second outlet 115-3 of the cyclone chamber are respectively connected with a first port and a second port of the four-way valve 150 of the primary sampling pipeline 117; and a diaphragm pump 110D connected with a third port of the four-way valve 150 of the primary sampling pipeline 117 through a ninth two-position three-way valve 101-9, wherein the diaphragm pump 110D is used to drive a gas flow in the primary sampling pipeline 117; a fourth port of the four-way valve 150 of the primary sampling pipeline 117 is connected with an external environment. A first port of the ninth two-position three-way valve 101-9 is connected with the third port of the four-way valve 150 of the primary sampling pipeline 117, and a second port of the ninth two-position three-way valve 101-9 is connected with an outside. Optionally, a filter may be provided between the outside and a second port of the ninth two-position three-way valve 101-9 to filter the external gas when the external gas enters the primary sampling pipeline 117.

The first outlet 115-2 of the cyclone chamber may be connected to a particulate filter 107-I and a flow regulator 106-11 before being connected to the first port of the four-way valve 150 of the primary sampling pipeline 117. The particle filter 107-I is used to remove particles in the gas discharged from the first outlet 115-2 of the cyclone chamber. The flow regulator 106-11 may adjust a flow of the gas flowing through, so as to achieve an effect of adjusting a pressure in the primary sampling pipeline 117, and thus achieve an effect of adjusting the sample extraction.

In an embodiment, the primary sampling pipeline 117 further includes: a three-way valve 140-11 of the primary sampling front end, a first port of the three-way valve 140-11 of the primary sampling front end is connected to the primary sampling front end 116, a second port of the three-way valve 140-11 of the primary sampling front end is connected to the first inlet 115-1 of the cyclone chamber, and a third port of the three-way valve 140-11 of the primary sampling front end is connected to the diaphragm pump 110D through an eighth two-position three-way valve 101-8, wherein when the eighth two-position three-way valve 101-8 is in position 1, the diaphragm pump 110D is in fluid communication with the three-way valve 140-11 of the primary sampling front end through a first end of the eighth two-position three-way valve 101-8, and when the eighth two-position three-way valve 101-8 is in position 0, the diaphragm pump 110D is connected with the outside through a second end of the eighth two-position three-way valve 101-8. A filter may be provided between the diaphragm pump 110D and the eighth two-position three-way valve 101-8.

Several modes of operation of the odor detecting device 11 may be described below. The odor sniffing device 11 may be operated in a primary sampling mode, wherein the eighth two-position three-way valve 101-8 is in position 0; the ninth two-position three-way valve 101-9 is in position 1; the diaphragm pump 110D operates to generate a suction force in the primary sampling pipeline 117; the primary sampling front end 116 sucks gas and/or particles inside the container; the sucked gas and/or particles enter the cyclone concentration sampler 115, a cyclone running from the first end to the second end is generated in the cyclone chamber, and a portion of the gas is discharged from the sample gas outlet 115-4 of the cyclone chamber and sent to a downstream gas path. The odor sniffing device 11 may be operated in a primary suspension mode, wherein the diaphragm pump 110D continues to operate, the eighth two-position three-way valve 101-8 is in position 0, and the ninth two-position three-way valve 101-9 is in position 0, or the diaphragm pump 110D is suspended. The odor sniffing device 11 may be operated in a primary cleaning mode, which includes two types. The first type of primary cleaning mode is: the eighth two-position three-way valve 101-8 is in position 1, the ninth two-position three-way valve 101-9 is in position 0, the diaphragm pump 110D operates to generate a suction force in the primary sampling pipeline 117, external air is sucked in through a second port of the ninth two-position three-way valve 101-9, and is sent to the primary sampling front end 116 through the primary sampling pipeline 117 for discharge, so as to clean a portion of the primary sampling pipeline 117 and the primary sampling front-end 116; or, the second type of primary cleaning mode is: the eighth two-position three-way valve 101-8 is in position 1, the ninth two-position three-way valve 101-9 is in position 1, and external air is sucked into the primary sampling pipeline 117 through the fourth port of the four-way valve 150 of the primary sampling pipeline 117, so as to clean the cyclone concentration sampler 115 and a portion of the primary sampling pipeline 117.

In this way, the primary sampling pipe 117 line of the odor sniffing device 11 may implement sampling or cleaning through a simple operation of the diaphragm pump 110D and a plurality of two-position three-way valves.

In an embodiment, the odor sniffing device 11 further includes a flow regulator 106-12 arranged between the fourth port of the four-way valve 150 of the primary sampling pipeline 117 and the external environment to control a flow of external gas entering the primary sampling pipeline 117. The odor sniffing device 11 is operated in the primary cleaning mode; when the eighth two-position three-way valve 101-8 is in position 1, the ninth two-position three-way valve 101-9 is in position 1, and the flow regulator 106-12 regulates the flow of external gas entering the primary sampling pipeline 117 to maintain a positive pressure in the primary sampling pipeline 117.

The odor sniffing device 11 provided by embodiments of the present disclosure further includes a secondary gas phase detection section. As shown in FIG. 2A, the part in a dotted line frame on the right side of FIG. 2A may be regarded as the primary sampling section, including the primary sampling pipeline 117, the cyclone concentration sampler 115, the diaphragm pump 110D, etc. The part in a dotted line frame on the left side of FIG. 2A may be regarded as the secondary gas phase detection section.

Figure 3:
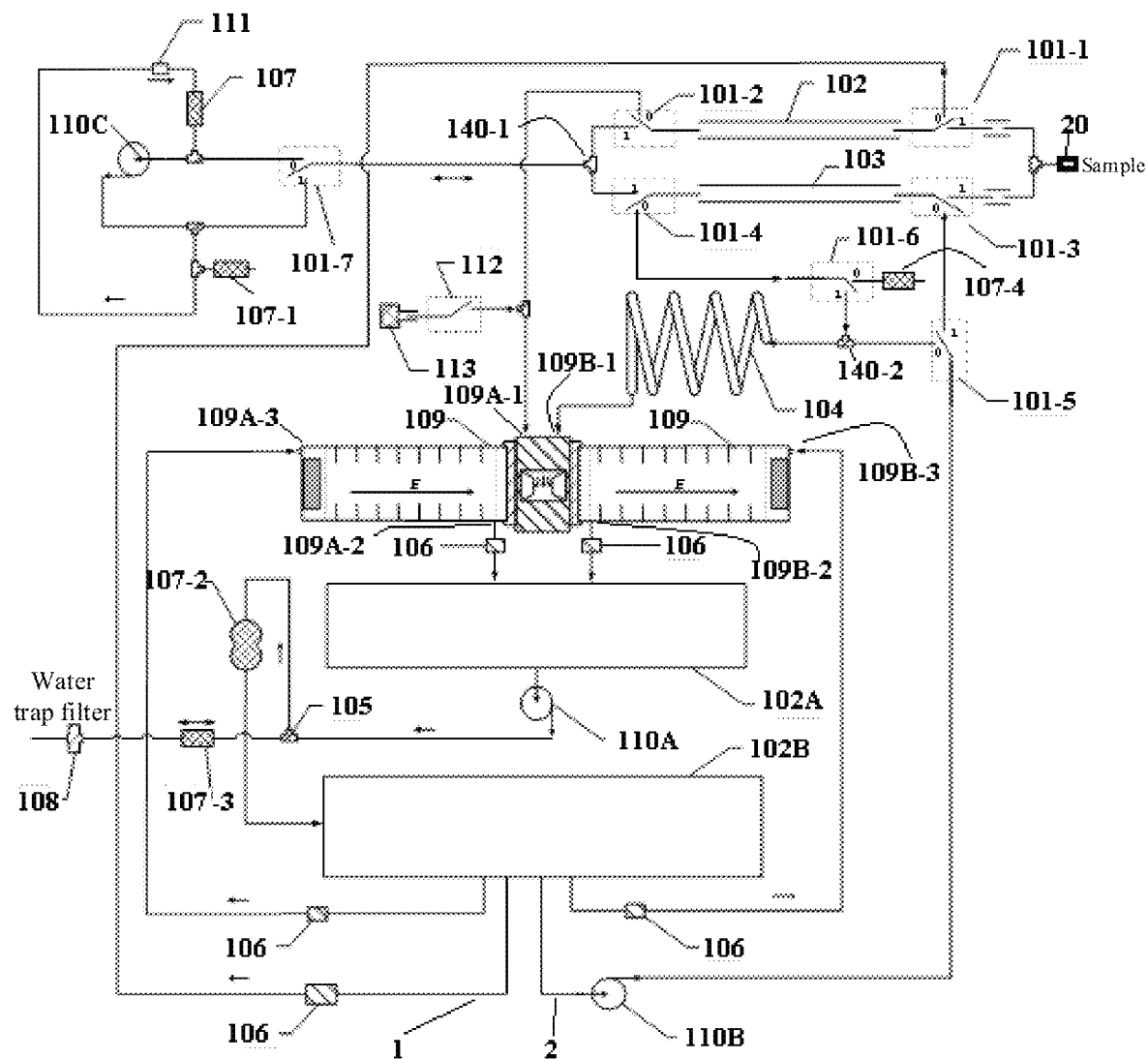
FIG. 3 shows a secondary detection section of an odor sniffing device according to an embodiment of the present disclosure.

FIG. 3 shows separately the part of dotted line frame on the left side of FIG. 2A.

In FIG. 3, the upper part of FIG. 3 may be considered as the gas path part for sampling, the ion migration tube 109 and the gas chromatographic column 104 on the lower part may be considered as the gas path part for detection. FIG. 3 further includes the gas path connecting the gas path part for sampling and the gas path part for detection. However, the secondary gas phase detection section may be partitioned in other ways, and this is merely to illustrate one way of partitioning.

The gas path for sampling in the upper part of FIG. 3 may include a sampling port 20 for collecting sample gas and a first sample tube 102 and/or a second sample tube 103 for storing the collected sample gas. In the embodiment shown in FIG. 3, the secondary sampling gas path includes a first sample tube 102 and a second sample tube 103, which may be used to store quantitative sample gas respectively. It is advantageous to use two sample tubes for storing quantitative sample gas in the present disclosure, which may use two sample tubes to collect sample gas simultaneously, so that a composition difference of the sample gas collected by two sample tubes may be minimized, or even substantially no difference, and it is allowed to provide sample gas with the same composition simultaneously or at different times for different detection, or only provide sample gas of one sample tube, which greatly facilitates a detection operation and improves an adaptability, efficiency and reliability of the detection.

In an embodiment, the gas phase detection device includes: a sampling gas path including a sampling head 20 for collecting sample gas and a first sample tube 102 and a second sample tube 103 connected to the sampling head for storing sample gas collected through the sampling head; an ion migration tube 109 for detecting sample gas; a sample injection gas path being in fluid communication with the sampling gas path and the ion migration tube, so that the sample gases stored in the first sample tube 102 and/or the second sample tube 103 are respectively introduced into the downstream ion migration tube; and a valve assembly configured to allow sample gas to be introduced into the first sample tube 102 and/or the second sample tube 103 in a sampling state, and allow sample gas to be introduced into the ion migration tube from the first sample tube 102 and/or the second sample tube 103 in a sample injection state.

The secondary sampling gas path further includes a secondary valve assembly. For example, as shown in FIG. 3, the secondary valve assembly includes a first two-position three-way valve 101-1 and a second two-position three-way valve 101-2, and the first sample tube 102 is arranged between the first two-position three-way valve 101-1 and the second two-position three-way valve 101-2. When the first two-position three-way valve 101-1 is in position 1, a first port of the first two-position three-way valve 101-1 is in fluid communication with the sampling port 20, and when the second two-position three-way valve 101-2 is in position 1, a first port of the second two-position three-way valve 101-2 discharges gas. When the first two-position three-way valve 101-1 is in position 0, a second port of the first two-position three-way valve 101-1 is in fluid communication with the secondary sample injection gas path to receive the gas in the secondary sample injection gas path, and when the second two-position three-way valve 101-2 is in position 0, a second port of the second two-position three-way valve 101-2 is in fluid communication with the secondary sample injection gas path to send the sample gas into the secondary sample injection gas path. During operation, the first two-position three-way valve 101-1 and the second two-position three-way valve 101-2 are in position 1, and the sample gas enters the first sample tube 102, then the sample gas may be temporarily stored in the first sample tube 102. The secondary gas phase detection section may further be operated as follows: the first two-position three-way valve 101-1 and the second two-position three-way valve 101-2 are switched to position 0, and the sample gas is sent to the downstream ion migration tube for detection.

The secondary valve assembly includes a third two-position three-way valve 101-3 and a fourth two-position three-way valve 101-4. The second sample tube 103 is arranged between the third two-position three-way valve 101-3 and the fourth two-position three-way valve 101-4. When the third two-position three-way valve 101-3 is in position 1, a first port of the third two-position three-way valve 101-3 is in fluid communication with the sampling port 20, and when the fourth two-position three-way valve 101-4 is in position 1, a first port of the fourth two-position three-way valve 101-4 discharges gas. When the third two-position three-way valve 101-3 is in position 0, a second port of the third two-position three-way valve 101-3 is in fluid communication with the secondary sample injection gas path to receive the gas in the secondary sample injection gas path, and when the fourth two-position three-way valve 101-4 is in position 0, a second port of the fourth two-position three-way valve 101-4 is in fluid communication with the secondary sample injection gas path to send the sample gas into the secondary sample injection gas path. During operation, the third two-position three-way valve 101-3 and the fourth two-position three-way valve 101-4 are in position 1, and the sample gas enters the second sample tube 103, then the sample gas may be temporarily stored in the second sample tube 103. The secondary gas phase detection section may further be operated as follows: the third two-position three-way valve 101-3 and the fourth two-position three-way valve 101-4 are switched to position 0, and the sample gas is sent to the downstream for detection or discharge. The above embodiments may implement the sampling of the first sample tube 102 and the second sample tube 103 respectively. For example, in one case, the sample head 20 is close to a to-be-inspected article, the first two-position three-way valve 101-1 and the second two-position three-way valve 101-2 are in position 1, the third two-position three-way 101-3 and the fourth two-position three-way 101-4 are in position 0, and the sample gas only enters the first sample tube 102. In another case, the sample head 20 is close to a to-be-inspected article, the first two-position three-way valve 101-1 and the second two-position three-way valve 101-2 are in position 0, the third two-position three-way valve 101-3 and the fourth two-position three-way valve 101-4 are in position 1, and the sample gas only enters the second sample tube 103. In another case, the sample gas enters the first sample tube 102 and the second sample tube 103 simultaneously, and may be stored in the first sample tube 102 and the second sample tube 103 for standby.

Embodiments of the present disclosure uses a configuration mode of a plurality of two-position three-way valves in combination with two sample tubes to implement a function of collecting, for example, quantitative sample gas through a switching of the secondary valve assembly (for example, a rapid switching of the valve to achieve pulse sampling). An amount of sample gas may be determined by a volume of the sample tube, so that a sampling action is quick and accurate. Generally, a volume of the sample tube is in an order of milliliter, such as one milliliter, 0.5 milliliter or other volumes. Each sampling will automatically collect a sample gas of a determined one milliliter, 0.5 milliliter or other volumes.

The secondary sampling gas path further includes a sampling pump 110C and a seventh two-position three-way valve 101-7. The sampling pump 110C is connected with the seventh two-position three-way valve 101-7, and the seventh two-position three-way valve 101-7 is connected with the first two-position three-way valve 101-1 and the second two-position three-way valve 101-2 respectively through a first three-way 140-1, so that when the seventh two-position three-way valve 101-7 is in position 0, the first sample tube 102 and/or the second sample tube 103 are allowed to flow to the sampling pump 110C. The sampling pump 110C may drive the sampling port 20 to draw samples from a to-be-inspected object into the first sample tube 102 and/or the second sample tube 103.

In a sampling state, when the first two-position three-way valve 101-1 and the second two-position three-way valve 101-2 are connected in position 1, and the seventh two-position three-way valve 101-7 is in position 0, the sampling pump 110C drives the sampling port 20 to suck sample gas, and the sample gas enters the first sample tube 102. Then, the connection of the first two-position three-way valve 101-1 and the second two-position three-way valve 101-2 is switched to position 0, the sampling is completed, and the sample gas is stored in the first sample tube 102, so as to implement a separate sampling of the first sample tube 102.

In another sampling state, when the third two-position three-way valve 101-3 and the fourth two-position three-way valve 101-4 are connected in position 1, and the seventh two-position three-way valve 101-7 is in position 0, the sampling pump 110C drives the sampling port 20 to suck sample gas, and the sample gas enters the second sample tube 103. Then the connection of the third two-position three-way valve 101-3 and the fourth two-position three-way valve 101-4 is switched to position 0, the sampling is completed, and the sample gas is stored in the second sample tube 103, so as to implement a separate sampling of the second sample tube 103.

In a further sampling state, the first two-position three-way valve 101-1 and the second two-position three-way valve 101-2 are connected in position 1, the third two-position three-way valve 101-3 and the fourth two-position three-way valve 101-4 are connected in position 1, the seventh two-position three-way valve 101-7 is in position 0, the sampling pump 110C drives the sampling port 20 to suck sample gas, and the sample gas enters the first sample tube 102 and the second sample tube 103. Then, the connection of the first two-position three-way valve 101-1 and the second two-position three-way valve 101-2 are switched to position 0, and the connection of the third two-position three-way valve 101-3 and the fourth two-position three-way valve 101-4 is switched to position 0. The sample suction is completed, and the sample gas is stored in the first sample tube 102 and the second sample tube 103, so as to implement simultaneous sampling of the two sample tubes.

It may be seen from the above that the secondary gas phase detection section of the present disclosure may implement separate sampling and storage of the first sample tube 102 and the second sample tube 103, and may also implement simultaneous sampling and storage, thus enriching functions of the secondary gas phase detection section.

The secondary gas phase detection section includes a first filter 107-1 configured to filter a gas flowing through the first filter 107-1. As shown in FIG. 3, the first filter 107-1 is connected to an external environment, which allows the sampling pump 110C to suck in samples.

In an embodiment, the secondary sampling gas path allows the first sample tube 102, the second sample tube 103, and the sampling port 20 to be cleaned with a gas. As shown in FIG. 3, the sampling pump 110C sucks in a gas through the first filter 107-1, drives the filtered gas into the secondary sampling gas path, and the filtered gas flows to the seventh two-position three-way valve 101-7 through the sampling pump 110C. At this point, the seventh two-position three-way valve 101-7 is in position 1, and the filtered gas then enters the first sample tube 102 and/or the second sample tube 103, and finally is discharged from the sampling port 20. The filtered gas passes through the secondary sampling gas path to implement a cleaning of the secondary sampling gas path. The secondary sampling gas path of the present disclosure is advantageous, and may collect sample gas and store the sample gas in either or both of the two sample tubes. The secondary sampling gas path further allows the secondary sampling gas path (including the first sample tube 102, the second sample tube 103 and the sampling port 20) to be cleaned through the sampling pump 110C, so as to achieve a compact gas path.

As shown in FIG. 3, the ion migration tube 109 is an integrated dual-mode all ceramic migration tube, and has a first ion migration tube 109A and a second ion migration tube 109B. However, in other embodiments, the ion migration tube 109 may be a single mode.

The ion migration tube 109 may include a sample injection inlet 109A-1 and a sample injection inlet 109B-1 for sample gas and carrier gas to flow in, a gas outlet 109A-2 and a gas outlet 109B-2 for gas to flow out, and a migration gas inlet 109A-3 and a migration gas inlet 109B-3 for migration gas to flow in.

As shown in FIG. 3, the sample injection inlet of the ion migration tube 109 includes the first sample injection inlet 109A-1. The secondary sample injection gas path sends the sample gas from the second two-position three-way valve 101-2 to the first sample injection inlet 109A-1 of the ion migration tube 109, so that the sample gas enters the ion migration tube 109 through the ion migration tube 109 for detection, for example, to determine a composition of the sample gas. The sample injection inlet of the ion migration tube 109 further includes a second sample injection inlet 109B-1. The secondary sample injection gas path first sends the sample gas from the fourth two-position three-way valve 101-4 to the gas chromatographic column 104, and then the sample gas is discharged from the gas chromatographic column 104. The sample gas is introduced into the second sample injection inlet 109B-1 through the secondary sample injection gas path and enters the ion migration tube 109 for detection. The sample gas may be separated by passing through the gas chromatographic column 104 first. A passage time of different components of gas substances in the gas chromatographic column 104 is different. The time for each gas component to pass through the gas chromatographic column 104 may be referred to a retention time of the gas component in the gas chromatographic column 104. Each gas component then enters the ion migration tube to detect a corresponding spectral peak, a peak value changes with a gas concentration of the component. The gas concentration of the component may be determined by integration, and the gas content of the component may be obtained by combining the sample tube with a fixed volume.

The sample gases in the first sample tube 102 and the second sample tube 103 are respectively introduced into the ion migration tube 109 through their respective gas paths (which may be referred to secondary sample injection gas path branches) to achieve separate detection and avoid mutual interference of the sample gases.

In embodiments of the present disclosure, the secondary gas phase detection section further includes a gas chromatographic column 104, which is used to separate mixed gases of complex components, and measure the retention time of gases of different components in the gas chromatographic column 104. The gas chromatographic column 104 is connected in series between the secondary sampling gas path and the ion migration tube 109, so that the sample gas in the second sample tube 103 enters the gas chromatographic column 104 for detection first, and then enters the ion migration tube 109 for detection. Therefore, the gas chromatographic column 104 may combine with the ion migration tube 109 to measure the content of gases of different components relative to the fixed sample tube volume.

The secondary gas phase detection section of the present disclosure may determine whether to further perform quantitative detection of the sample gas in the second sample tube 103 by the gas chromatographic column 104—ion migration tube 109 based on the qualitative detection of the sample gas from the first sample tube 102 by the ion migration tube 109, and comprehensively determine the detection results.

Embodiments of the present disclosure may meet requirements of simultaneous sampling by using the first sample tube 102 and the second sample tube 103, and then conducting qualitative detection of the sample gas of the first sample tube 102 through the ion migration tube 109. If the sample gas contains a suspect substance, the sample gas of the second sample tube 103 is sent to the gas chromatographic column 104—ion migration tube 109 for quantitative detection, and the content of samples of various components is obtained. If the sample gas does not contain any suspect substance, the sample gas is discharged from the second sample tube 103. This is advantageous. On the one hand, since double sample tubes are configured for sampling, sample gases with substantially the same composition may be collected separately simultaneously. On the other hand, a simple and rapid qualitative inspection may be carried out first. If it is determined that there is no suspect substance, the gas in the second sample tube may be directly discharged. If it is determined that the sample gas contains a suspect substance, a quantitative inspection may be carried out according to the situation. Furthermore, after the sample gas is collected, the to-be-detected article may leave a collection region, making a collection efficiency high. Even if the qualitative inspection determines that the sample gas contains a suspect substance, it is not necessary for the to-be-detected article to return to the collection region again, but it is only necessary to measure the sample gas in the second sample tube quantitatively.

The secondary gas phase detection section of the present disclosure includes a secondary sample injection gas path, which is in fluid communication with the secondary sampling gas path, the ion migration tube 109, and the gas chromatographic column 104, so as to introduce the quantitative sample gas stored in the first sample tube 102 and/or the second sample tube 103 into the ion migration tube 109 and/or the gas chromatographic column 104.

In the embodiment shown in FIG. 3, the secondary gas phase detection section further includes an internal circulation gas path, so that at least a portion of the gas discharged from a gas outlet of the ion migration tube 109 is sent back to a migration gas inlet of the ion migration tube 109 by the internal circulation gas path. At least a portion of the gas discharged from a gas outlet of the ion migration tube 109 is sent back to the second port of the first two-position three-way valve 101-1 and/or the second port of the third two-position three-way valve 101-3 by the secondary sample injection gas path. The internal circulation gas path includes a circulating drive pump, such as a diaphragm pump 110D, which may drive the gas to circulate in the internal circulation gas path. In order to avoid vibration, the internal circulation gas path includes a first buffer chamber 102A and a second buffer chamber 102B, and the circulating drive pump is arranged between the first buffer chamber 102A and the second buffer chamber 102B. The first buffer chamber 102A receives the gas discharged from the ion migration tube 109 and absorbs the vibration of the gas. The gas discharged from the first buffer chamber 102A flows to the second buffer chamber 102B under an action of the circulating drive pump. The second buffer chamber 102B absorbs the vibration of the gas. One part of the gas discharged from the second buffer chamber 102B circulates in the internal circulation gas path as the migration gas of the ion migration tube 109, and the other part of the gas discharged from the second buffer chamber 102B enters the secondary sample injection gas path. The first buffer chamber 102A and the second buffer chamber 102B may reduce an impact of a pulse gas flow on the gas flow in the ion mobility spectrometer, and reduce an impact of the pulse gas flow on the gas chromatographic column 104.

The internal circulation gas path further includes a flow control valve 106, which is arranged between the ion migration tube 109 and the first buffer chamber 102A, so that the user may balance or cut off a non corresponding detection mode according to the electrophilic properties or nucleophilic properties of the detected samples, so as to choose to detect only in a negative mode, only in a positive mode, or simultaneously in the negative and positive modes, thereby improving a selective detection of the instrument on the sample. In the embodiment shown in FIG. 3, the first second ion migration tube 109 and the second ion migration tube 109 of the dual-mode ion migration tube 109 are respectively connected to a flow control valve 106.

The internal circulation gas path further includes a second filter 107-2 arranged between the first buffer chamber 102A and the second buffer chamber 102B. The second filter 107-2 may filter the gas discharged from the first buffer chamber 102A, and the filtered gas enters the second buffer chamber 102B, so as to avoid providing a purification filter again on the circulation gas path, thereby saving a manufacturing cost. It should be noted that those skilled in the art should understand that, in some other embodiments of the present disclosure, the second filter 107-2 may further be provided at other positions of the secondary sample injection gas path, such as between the first buffer chamber 102A and the gas outlet of the ion migration tube 109.

The internal circulation gas path further includes a gas supply/gas release gas path for gas supply or gas release to the ion migration tube 109. A first port of the gas supply/gas release gas path is connected with the gas outlet of the ion migration tube 109, and a second port of the gas supply/gas release gas path is connected with the external environment. By providing the gas supply/release circuit, the ion-exchange tube 109 may automatically supply and release gas according to changes of the environment, the micro sampling, and the temperature of the ion-exchange tube 109, so as to achieve rapid sampling.

In an embodiment, a third filter 107-3 is provided on the gas supply/gas release gas path to purify the gas flowing through the gas supply/gas release gas path, reduce an impact of the outside on the ion migration spectrometer, and improve a service life of a gas purifier (molecular sieve, active carbon, etc.).

The internal circulation gas path further includes a three-way valve 105 arranged between the circulating drive pump and the filter. The first port of the gas supply/gas release gas path is connected with the internal circulation gas path through the three-way valve 105. The three-way valve 105 is configured to allow only the gas to flow from the circulating drive pump to the second filter 107-2 under a sample injection state, but not from the three-way valve 105 to the outside. In the gas release state, the gas is only allowed to flow from the circulating drive pump to the external environment, but not to the second filter 107-2. The external gas is allowed to flow to the second filter 107-2 in the gas supply state. Through the three-way valve 105, the secondary sample injection gas path, the gas supply gas path and the gas release gas path may be selectively connected.

A water trap filter 108 is further provided on the gas supply/gas release gas path, and the water trap filter 108 is located between the third purification filter 107-3 and the external environment to further reduce an impact of the external environment on the ion mobility spectrometer.

The gas in the internal circulation gas path is discharged from the second buffer chamber 102B, and a part of the gas circulates in the internal circulation gas path and flows back to the ion migration tube 109. The part of the gas may flow to the first ion migration tube 109 and the second ion migration tube 109 respectively from the two flow paths. Further, a flow regulator may be provided to regulate the flow rate of gas flowing to the first ion migration tube 109 and the second ion migration tube 109. The flow regulator may be arranged between the second buffer chamber 102B and the ion migration tube 109.

It is advantageous that the secondary gas phase detection section includes the internal circulation gas path, which allows the circulating drive pump to keep working and the gas to circulate in the internal circulation gas path, so that the sample gas in the first sample tube 102 and/or the second sample tube 103 may be sent into the ion migration tube 109 and the gas phase chromatographic column 104 in real time. Moreover, since a filter is provided, the gas in the secondary sample injection gas path may be kept clean. A gas pressure in the secondary sample injection gas path may be kept as a set value due to the provision of the gas supply/gas release gas path.

In an embodiment, the secondary gas phase detection section further includes a fifth two-position three-way valve 101-5. When the fifth two-position three-way valve 101-5 is in position 1, the first port is in communication with the second port of the third two-position three-way valve 101-3, and when the fifth two-position three-way valve 101-5 is in position 0, a fluid communication between the secondary sample injection gas path and the third two-position three-way valve 101-3 is disconnected.

In an embodiment, the secondary gas phase detection section further includes the chromatographic booster pump 110B arranged upstream of the fifth two-position three-way valve 101-5. When the fifth two-position three-way valve 101-5 is in position 0, the gas is driven to enter the gas chromatographic column 104 along the secondary sample injection gas path and is boosted.

In an embodiment, the secondary gas phase detection section further includes a sixth two-position three-way valve 101-6 arranged in the secondary sample injection gas path. When the sixth two-position three-way valve 101-6 is in position 1, the gas received from the fourth two-position three-way valve 101-4 is sent to the gas chromatographic column 104 through the first port of the sixth two-position three-way valve 101-6. When the sixth two-position three-way valve 101-6 is in position 0, the sixth two-position three-way valve 101-6 disconnects a fluid communication with the gas chromatographic column 104, and the second port of the sixth two-position three-way valve 101-6 is connected to the outside through a fourth filter 107-4, allowing to discharge the gas in the second sample tube 103 to the outside. The provision of the sixth two-position three-way valve 101-6 is advantageous. When the sample gas in the first sample tube 102 is determined not to contain a suspect substance through a detection of the ion migration tube 109, the sample gas in the second sample tube 103 may be discharged through the second port of the sixth two-position three-way valve 101-6, thus allowing the first sample tube 102 and the second sample tube 103 to collect sample gas simultaneously during sampling, and further allowing to discharge the sample gas in the second sample tube 103 when a further quantitative detection is not required, thus it is possible to quickly determine whether the to-be-detected article contains a suspect substance and quantitatively determine the suspect substance.

The fourth filter 107-4 may prevent a pollution caused by external gas entering the secondary sample injection gas path.

In an embodiment, the secondary gas phase detection section further includes a second three-way 140-2 arranged between the sixth two-position three-way valve 101-6 and the gas chromatographic column 104. The second three-way 140-2 connects the sixth two-position three-way valve 101-6, the gas chromatographic column 104 and the second port of the fifth two-position three-way valve 101-5. In an embodiment, when the fifth two-position three-way valve 101-5 is in position 1, a fluid communication between the second three-way 140-2 and the fifth two-position three-way valve 101-5 is disconnected, and the sixth two-position three-way valve 101-6 may be in fluid communication with the gas chromatographic column 104 through the second three-way 140-2. When the sixth two-position three-way valve 101-6 is in position 0, a fluid communication between the second three-way 140 and the sixth two-position three-way valve 101-6 is disconnected, the fifth two-position three-way valve 101-5 may be in fluid communication with the gas chromatographic column 104 through the second three-way 140-2, and a part of the gas may circulate in the gas chromatographic column 104, the ionization migration tube 109, the chromatographic booster pump and the fifth two-position three-way valve 101-5.

After a part of the gas in the internal circulation gas path is discharged from the second buffer chamber 102B, a part of the above gas enters a first secondary sample injection gas path branch 1, such as a left part shown in FIG. 3, and returns to the first two-position three-way valve 101-1 through the secondary sample injection gas path branch 1. At this point, if the first two-position three-way valve 101-1 is in position 0 and the second two-position three-way valve 101-2 is in position 0, the gas will circulate in the secondary sample injection gas path. After a part of the gas in the internal circulation gas path is discharged from the second buffer chamber 102B, another part of the above gas enters a second secondary sample injection gas path branch 2, such as a right part shown in FIG. 3, and returns to the fifth two-position three-way valve 101-5 through the secondary sample injection gas path branch 2. At this point, if the fifth two-position three-way valve 101-5 is in position 0 and the sixth two-position three-way valve 101-6 is in position 0, the gas will circulate in the secondary sample injection gas path.

In an embodiment of the present disclosure, the secondary gas phase detection section further includes an online internal calibration gas path including a calibrator container 113 that provides a calibrator and a calibration solenoid valve 112 that connects the calibrator container to the secondary sample injection gas path. The calibration solenoid valve is configured to provide a trace calibrator to the secondary sample injection gas path through an on-off operation during a detection process of the secondary gas phase detection section. The embodiment is advantageous. The online internal calibration gas path allows an online real-time calibration of the secondary gas phase detection section, thus ensuring an accuracy of the secondary gas phase detection section. The design of online internal calibration gas path implements an adaptability of the ion mobility spectrometer to the detection environment.

The secondary gas phase detection section of the present disclosure may be operated in a plurality of modes. In an embodiment, the secondary gas phase detection section may be operated in a first detection mode. The sampling port 20 is close to a detected target, the first two-position three-way valve 101-1 and the second two-position three-way valve 101-2 are in position 1, and the sample gas is collected through the sampling port 20 and enters the first sample tube 102; then the first two-position three-way valve 101-1 and the second two-position three-way valve 101-2 are switched to position 0, and the gas in the secondary sample injection gas path drives the sample gas in the first sample tube 102 to enter the ion migration tube 109 for detection.

In an embodiment, the secondary gas phase detection section may be operated in a second detection mode. The sampling port 20 is close to a detected target, the third two-position three-way valve 101-3 and the fourth two-position three-way valve 101-4 are in position 1, and the sample gas is collected through the sampling port 20 and enters the second sample tube 103; then the third two-position three-way valve 101-3 and the fourth two-position three-way valve 101-4 are switched to position 0, and the gas in the secondary sample injection gas path drives the sample gas in the second sample tube 103 into the gas chromatographic column 104, and then into the ion migration tube 109 for detection.

In an embodiment, the secondary gas phase detection section may be operated as a third detection mode. The sampling port 20 is close to a detected target, the first two-position three-way valve 101-1, the second two-position three-way valve 101-2, the third two-position three-way 101-3 and the fourth two-position three-way 101-4 are in position 1, and the sample gas is collected through the sampling port 20, and enters the first sample tube 102 and the second sample tube 103 respectively; then the first two-position three-way valve 101-1, the second two-position three-way valve 101-2, the third two-position three-way 101-3 and the fourth two-position three-way 101-4 are switched to position 0, and the gas in the secondary sample injection gas path drives the sample gas of the first sample tube 102 into the ion migration tube 109 for detection, and drives the sample gas in the second sample tube 103 into the gas chromatographic column 104, and then into the ion migration tube 109 for detection.

The present disclosure further provides a secondary gas phase detection section that allows ion mobility spectrometer detection to be performed on the inspected target independently, for example, the first sample tube 102 is used to collect the sample, a qualitative detection is quickly performed to determine whether the detected target contains a prohibited article. The secondary gas phase detection section may further detect a detected target with gas chromatograph—ion mobility spectrometer, so as to detect more complex mixed components, determine an exact nature and concentration of the detected target, and achieve a high accuracy detection. The secondary gas phase detection section may further use the ion migration tube 109 for qualitative detection first, and automatically determine whether to conduct the gas chromatograph—ion migration spectrometer detection or not based on the qualitative results for confirmation, so as to save the detection time of a non-suspected object. Quantitative detection may further be implemented, and quick switching of different detection states may be implemented through switching of three-way valve to obtain an effect of quick detection.

In embodiments of the present disclosure, the sampling, sample injection, internal circulation and cleaning processes may be implemented by quick switching of valves. In the sampling process, pulse sampling or continuous sampling may be implemented by controlling the quick switching on and off time of the two-position three-way electromagnetic valve in the sampling gas path. The pulse sample injection time may be as low as millisecond, and a minimum sampling amount of a single pulse may be as low as a microliter level (for example, a sampling gas flow is 1 L/min). The direct sample injection mode of millisecond or hundreds millisecond pulse sampling may not only improve a sensitivity of trace detection, but also minimize an impact of harsh external detection environment on an accuracy of ion migration detection.

The odor sniffing system provided by the present disclosure adopts a two-stage sampling method. The first stage sampling adopts a cyclone concentration self-cleaning system, and the second stage sampling adopts a pulse sampling technology, which has a long sampling distance, may concentrate the collected samples, and may prevent equipment residue or poisoning caused by sample injection overload.

The odor detection system provided by the present disclosure implements the multi-mode switching and detection of a single device, implements a quantitative detection of the sample, and comprehensively determines the analysis results, and the detection result is more reliable.

Embodiments of the present disclosure further provides a vehicle-mounted security inspection apparatus 1 for a container, including: a vehicle 2; an imaging inspection section 3 mounted on the vehicle and configured to perform an inspection on a to-be-inspected object in an imaging manner, such as X-ray or other radiolucent imaging, e.g., millimeter-wave reflection imaging, CT imaging, etc.; a robot arm 4 mounted on the imaging inspection section; and the odor sniffing device 11 of the above-mentioned embodiments, wherein the first sampling front end 116 of the odor sniffing device 11 is mounted on the robot arm; the robot arm enables the primary sampling front end 116 to access to a ventilator of a container, so as to extract gas and/or particles inside the container from the ventilator. The vehicle-mounted security inspection apparatus for a container provided by the present disclosure conducts a suction sampling on a surface and interior of a large container/vehicle in an efficient and flexible manner to implement a detection of volatile dangerous chemicals, volatile toxic and harmful substances, fumigant residues, etc. while performing fluoroscopy imaging/backscatter imaging on the to-be-inspected object in a large container/vehicle imaging inspection system, thus realizing a leap from scratch in technology.

Figure 1:
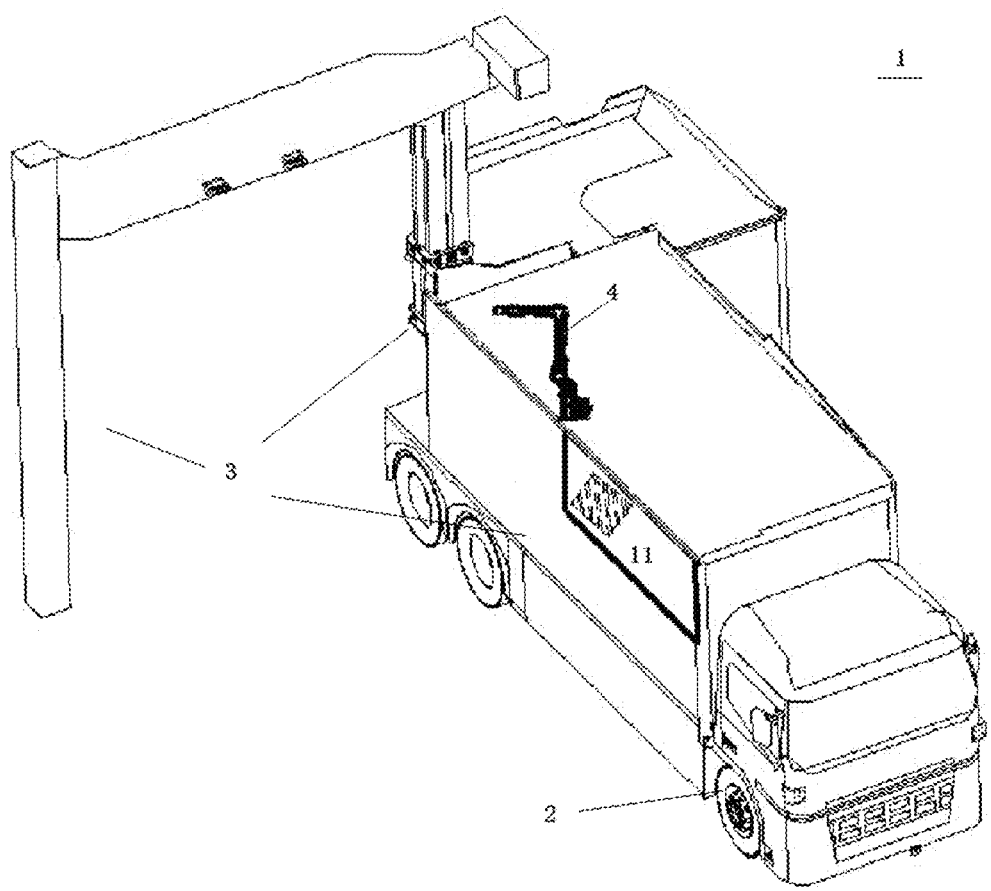
FIG. 1 shows a schematic diagram of a vehicle-mounted security inspection apparatus according to an embodiment of the present disclosure.

As shown in FIG. 1, the vehicle 2 includes a box or a housing, the imaging inspection section 3 may be accommodated in the box or the housing, and the imaging inspection section 3 may occupy a part of the space in the box or the housing. A part of the odor sniffing device 11 of the vehicle-mounted security inspection apparatus 1 may be installed in the box or housing, and the odor sniffing device 11 may be considered to be installed on the imaging inspection section in the box or housing, for example, the robot arm is installed on the imaging inspection section, and an external part of the box or housing, while the secondary gas phase detection section of the odor sniffing device 11 is contained in the box or housing. In this way, the box or housing of the vehicle is convenient for transportation as a whole, and imaging inspection and odor detection may be carried out simultaneously.

The imaging inspection section 3 may include, for example, a source and a detector arm. As shown in FIG. 1, the source is arranged in the box or the housing, the detector arm is arranged in a part of the box or the housing, and the part of the box or the housing containing the detector arm may move relative to the rest of the box or the housing (the part containing the odor sniffing device 11 and the source). For example, the part of the box or housing containing the detector arm may slide from a transportation position to an inspection position. When being in the transportation position, the part of the box or housing containing the detector arm and the remaining part of the box or housing form a complete box or housing, such as a cuboid box or housing; and when being in the inspection position, the part of the box or housing containing the detector arm slides in a vertical direction of a longitudinal direction of a vehicle body, stagger a certain distance from the remaining part of the box or housing, and the detector arm moves out the part of the box or housing and extends in the vertical direction of the longitudinal direction of the vehicle body, thus defining an inspection channel with the source contained in the remaining part of the box or housing. However, it should be understood that the source may also be accommodated with the detector arm in a part of the box or housing. An arrangement of the odor sniffing device 11 in the box or housing is not limited to the arrangement on the imaging inspection section. The odor sniffing device 11 and the imaging inspection section may be arranged together in the box and housing, and their relative positions may be adjusted according to space or design needs.

The container ventilator sampling device applicable to container security inspection provided by the present disclosure is designed to collect an odor of toxic and harmful gases/dangerous chemicals inside a container at the container ventilator without damaging the container and the sampling probe.

The container ventilator sampling device applicable to container security inspection provided by the present disclosure uses a mechanical arm to automatically seek the container ventilator, which is not only convenient for integration with the large container vehicle-mounted security inspection system, but also has higher positioning speed and sampling efficiency than a manual mode.

The container ventilator sampling device applicable to container security inspection provided by the present disclosure adopts multi-stage sampling technology, and the first stage adopts a cyclone concentration sampling and self-cleaning technology, and the second stage adopts a pulse sampling technology, which may not only achieve effective sample collection but also not cause sampling overloading of device to introduce residues.

In an embodiment, the vehicle-mounted security inspection apparatus further includes an intelligent identification device based on a camera device, which is configured to collect an image of the container and a surrounding environment, and use an intelligent algorithm to locate a position of the ventilator of the container by automatically identifying the collected image of the container, so as to control the robot arm to position the primary sampling front end 116 on the container ventilator for sampling. The intelligent identification device may implement automatic positioning, such as positioning the primary sampling front end 116 on the container ventilator for sampling, and may include an industrial robot vision system, an auxiliary sensor installed outside a cabin, etc. The robot vision system may be based on camera, integrate infrared and laser radar, and use AI algorithm to automatically identify the surrounding environment and objects. The primary sampling section is installed at a front end of the robot arm (as shown in FIG. 1), and the intelligent identification device intelligently assists the primary sampling section to conduct container ventilator positioning, purging and sealing sampling through real-time infrared, a radar and video signal and an AI algorithm. The arranged air or wind knife purging system may purge, remove dust and moisture from the ventilator of the container and an adjacent surface of the ventilator of the container when the industrial robot drives the primary sampling section to approach the ventilator of the container, so as to prevent dust and moisture from affecting the sampling and detection device. After the dust removal and moisture removal processes are completed, the intelligent identification device will continue to drive the primary sampling section to force the vent adapter 116-1 to cling to the ventilator of the container and start the diaphragm pump 110D for sampling inside the container.

It will be appreciated by those skilled in the art that embodiments described above are exemplary, and may be modified by those skilled in the art. The structures described in various embodiments may be freely combined without conflict in structure or principle.

The present disclosure has been described in combination with the accompanying drawings. However, the embodiments disclosed in the accompanying drawings are intended to be illustrative of embodiments of the present disclosure and should not be construed as limiting the present disclosure.

It should be noted that the word "including" do not exclude other elements or steps, and the words "a" or "an" do not exclude multiple; "upper" and "lower" are only used to indicate the orientation of the components in the illustrated structure, and are not intended to limit the absolute orientation thereof; "first" and "second" are used to distinguish names of different components, not to rank or indicate an importance or primary and secondary differences. In addition, any element numbers in the claims should not be construed as limiting the scope of the present disclosure.

Some embodiments of the general inventive concept have been shown and described. However, those skilled in the art will understand that these embodiments may be modified without departing from the principle and spirit of the general inventive concept, and the scope of the present disclosure is defined by the claims and their equivalents.

What is claimed is:

1. An odor sniffing device, configured to perform an inspection by sniffing gas and/or particulate matter in an inspected object, and the odor sniffing device comprising:
    a primary sampling front end (116) configured to be accessible to a ventilator of a container and provide a suction force, so that the primary sampling front end collects gas and/or particles inside the container;
    wherein the primary sampling front end (116) has a vent adapter having a shape matching with a vent of the ventilator of the container, so that when the primary sampling front end fits with the ventilator, the vent adapter and the vent cooperate to achieve fluid communication,
    wherein the odor sniffing device comprises: a cyclone concentration sampler (115) defining a cyclone chamber and comprising opposing first and second ends; and a primary sampling pipeline (117) being at least in fluid communication with the primary sampling front end (116) and the cyclone concentration sampler (115), the cyclone chamber of the cyclone concentration sampler (115) has a substantially tapered three-dimensional shape, the cyclone chamber has a first tapered part (115-I) close to the first end and a second tapered part (115-II) close to the second end, and in a cross section along an axis of the cyclone concentration sampler (115), an angle (a) between side walls (115-c, 115-d) on two sides of the second tapered part (115-II) is greater than an angle (B) between side walls (115-a, 115-b) on two sides of the first tapered part (115-I); and
    wherein the cyclone concentration sampler comprises: a first inlet (115-1) of the cyclone chamber at an end face of the first end, configured to be in fluid communication with the primary sampling front end (116) through a portion of the primary sampling pipeline (117), and to introduce the gas and/or particulate matter collected by the primary sampling front end into the cyclone chamber, wherein the gas discharged from the first inlet (115-1) of the cyclone chamber is enabled for forming a cyclone airflow flowing from the first end to the second end in the cyclone chamber; a first outlet (115-2) of the cyclone chamber at the second end configured to allow at least a portion of the gas and/or particulate matter in the cyclone chamber to be discharged from the first outlet of the cyclone chamber; and a sample gas outlet (115-4) of the cyclone chamber located on a side wall near the second end, configured to allow at least a portion of the sample gas to be discharged from the sample gas outlet of the cyclone chamber, wherein the sample gas outlet (115-4) of the cyclone chamber is closer to the first end than the first outlet (115-2) of the cyclone chamber.

2. The odor sniffing device according to claim 1, wherein the first inlet (115-1) of the cyclone chamber blows gas downward in a direction of the first end of the cyclone chamber toward the second end.

3. The odor sniffing device according to claim 1, wherein the first inlet (115-1) of the cyclone chamber is arranged in a substantially central position of the first end of the cyclone chamber.

4. The odor sniffing device according to claim 1, wherein the cyclone concentration sampler (115) further comprises a second outlet (115-3) of the cyclone chamber located on the side wall and close to the first end, configured to allow at least a portion of the gas and/or particulate matter in the cyclone chamber to be discharged from the second outlet of the cyclone chamber.

5. The odor sniffing device according to claim 1, wherein the primary sampling pipeline (117) comprises:
    a four-way valve (150) of the primary sampling pipeline (117), wherein the first outlet (115-2) of the cyclone chamber and a second outlet (115-3) of the cyclone chamber are respectively connected with a first port and a second port of the four-way valve of the primary sampling pipeline (117); and
    a diaphragm pump (110D) connected with a third port of the four-way valve (150) of the primary sampling pipeline (117) through a ninth two-position three-way valve (101-9), wherein the diaphragm pump is configured to drive a gas flow in the primary sampling pipeline (117);
    wherein a fourth port of the four-way valve (150) of the primary sampling pipeline (117) is connected with an external environment.

6. A vehicle-mounted security inspection apparatus for a container, comprising:
    a vehicle;
    an imaging inspection section mounted on the vehicle and configured to perform an inspection on a to-be-inspected object in an imaging manner;
    a robot arm mounted on the imaging inspection section; and
    the odor sniffing device according to claim 1, wherein the primary sampling front end (116) of the odor sniffing device is mounted on the robot arm;
    wherein the robot arm enables the primary sampling front end to access to a ventilator of a container, so as to extract gas and/or particles inside the container from the ventilator,
    the vehicle-mounted security inspection apparatus, further comprising an intelligent identification device based on a camera device, configured to collect an image of the container and a surrounding environment, and use an intelligent algorithm to locate a position of the ventilator of the container by automatically identifying the collected image of the container, so as to control the robot arm to position the primary sampling front end (116) on the ventilator of the container for sampling,
    the vehicle-mounted security inspection apparatus, further comprising a wind knife configured to gas-purge the ventilator of the container and an adjacent surface of the ventilator of the container for dust removal and moisture removal before an end portion of the robot arm is brought into proximity with the ventilator of the container.

7. The odor sniffing device according to claim 1, wherein a basal diameter (d1) of the first tapered part (115-1) is larger than a basal diameter (d2) of the second tapered part (115-II) in an extension direction from the first end of the cyclone concentration sampler (115) to the second end of the cyclone concentration sampler (115).

8. The odor sniffing device according to claim 7, wherein the sample gas outlet (115-4) of the cyclone chamber is arranged on a side wall of the second tapered part (115-II) of the cyclone concentration sampler, a sample in the cyclone airflow is discharged through the sample gas outlet (115-4) of the cyclone chamber, and the first outlet (115-2) of the cyclone chamber is at a top of a cone of the second tapered part (115-II).

9. The odor sniffing device according to claim 1, wherein the primary sampling pipeline (117) comprises a three-way valve (140-11) of the primary sampling front end, wherein a first port of the three-way valve of the primary sampling front end is connected to the primary sampling front end (116), and a second port of the three-way valve of the primary sampling front end is connected to the first inlet (115-1) of the cyclone chamber, a third port of the three-way valve of the primary sampling front end is connected to a diaphragm pump (110D) through an eighth two-position three-way valve (101-8), wherein when the eighth two-position three-way valve is in position 1, the diaphragm pump is in fluid communication with the three-way valve of the primary sampling front end through a first port of the eighth two-position three-way valve, and when the eighth two-position three-way valve is in position 0, the diaphragm pump is in communication with an outside through a second port of the eighth two-position three-way valve.

10. The odor sniffing device according to claim 9, wherein the odor sniffing device is configured to be:
operable in a primary sampling mode, wherein the eighth two-position three-way valve (101-8) is in position 0, a ninth two-position three-way valve (101-9) is in position 1, the diaphragm pump (110D) operates to generate a suction force in the primary sampling pipeline (117), the primary sampling front end (116) sucks gas and/or particles inside the container, the sucked gas and/or particles enter the cyclone concentration sampler (115), a cyclone running from the first end to the second end is generated in the cyclone chamber, and a portion of the gas is discharged from the sample gas outlet (115-4) of the cyclone chamber and sent to a downstream gas path; or
operable in a primary suspension mode, wherein the diaphragm pump (110D) continues to operate, the eighth two-position three-way valve (101-8) is in position 0, and the ninth two-position three-way valve (101-9) is in position 0; or the diaphragm pump (110D) is suspended; or
operable in a primary cleaning mode, wherein the eighth two-position three-way valve (101-8) is in position 1, the ninth two-position three-way valve (101-9) is in position 0, the diaphragm pump (110D) operates to generate a suction force in the primary sampling pipeline (117), external air is sucked in through a second port of the ninth two-position three-way valve, and is sent to the primary sampling front end (116) through the primary sampling pipeline (117) for discharge, so as to clean a portion of the primary sampling pipeline (117) and the primary sampling front end; or the eighth two-position three-way valve (101-8) is in position 1, the ninth two-position three-way valve (101-9) is in position 1, and external air is sucked into the primary sampling pipeline (117) through the fourth port of the four-way valve (150) of the primary sampling pipeline (117), so as to clean the cyclone concentration sampler (115) and a portion of the primary sampling pipeline (117),
wherein the odor sniffing device further comprises a flow regulator (106-12) arranged between the fourth port of the four-way valve (150) of the primary sampling pipeline (117) and the external environment to control a flow of external gas entering the primary sampling pipeline (117);
the odor sniffing device is operated in the primary cleaning mode, the eighth two-position three-way valve (101-8) is in position 1, and the ninth two-position three-way valve (101-9) is in position 1, the flow regulator regulates the flow of external gas entering the primary sampling pipeline (117) to maintain a positive pressure in the primary sampling pipeline (117),
wherein a secondary gas phase detection section comprises a first filter (107-1) configured to filter a gas flowing through the first filter, and allow the gas to enter a secondary sampling gas path through the first filter, so that when the seventh two-position three-way valve is in position 1, a sampling pump is enabled for reversely driving the gas filtered by the first filter to flow into a first sample tube and/or a second sample tube through the seventh two-position three-way valve, and then discharge the gas from a sampling port.

11. The odor sniffing device according to claim 1, wherein the odor sniffing device further comprises a secondary gas phase detection section comprising:
a secondary sampling gas path comprising a sampling port (20) for collecting a sample gas, a first sample tube (102) and a second sample tube (103) for storing the sample gas collected through the sampling port;
an ion migration tube (109);
a secondary sample injection gas path being in fluid communication with the secondary sampling gas path and the ion migration tube, so that the sample gases stored in the first sample tube (102) and/or the second sample tube (103) are respectively introduced into the downstream ion migration tube; and
a secondary valve assembly configured to allow the sample gas to be introduced into the first sample tube (102) and/or the second sample tube (103) in a sampling state, and allow the sample gas to be introduced into the ion migration tube from the first sample tube (102) and/or the second sample tube (103) in a sample injection state.

12. The odor sniffing device according to claim 11, wherein the secondary gas phase detection section further comprises a gas chromatographic column (104) arranged upstream of the ion migration tube in the secondary sampling gas path in a gas injection direction, so that the sample gas from one of the first sample tube (102) and the second sample tube (103) passes through the gas chromatographic column first, and then is sent to the ion migration tube,
wherein the secondary valve assembly comprises a first two-position three-way valve (101-1) and a second two-position three-way valve (101-2); the first sample tube (102) is arranged between the first two-position three-way valve and the second two-position three-way valve, wherein when the first two-position three-way valve is in position 1, the first sample tube (102) is in fluid communication with the sampling port through a first port of the first two-position three-way valve, and when the second two-position three-way valve is in position 1, the first sample tube (102) discharges gas through a first port of the second two-position three-way valve; and the secondary valve assembly comprises a third two-position three-way valve (101-3) and a fourth two-position three-way valve (101-4); the second sample tube (103) is arranged between the third two-position three-way valve and the fourth two-position three-way valve, wherein when the third two-position three-way valve is in position 1, the second sample tube (103) is in fluid communication with the sampling port through a first port of the third two-position three-way valve, and when the fourth two-position three-way valve is in position 1, the second sample tube (103) discharges gas through a first port of the fourth two-position three-way valve.

13. The odor sniffing device according to claim 11, wherein the secondary gas phase detection section further comprises an online internal calibration gas path, wherein the online internal calibration gas path comprises a calibrator container (113) providing a calibrator and a calibration solenoid valve (112) connecting the calibrator container to the secondary sample injection gas path; the calibration solenoid valve is configured to provide a trace calibrator to the secondary sample injection gas path through an on-off operation during a detection process of the secondary gas phase detection section, wherein the first sample tube and the second sample tube are configured to have a set fixed volume.

14. The odor sniffing device according to claim 11, wherein, the secondary valve assembly comprises a first two-position three-way valve (101-1) and a second two-position three-way valve (101-2); the first sample tube (102) is arranged between the first two-position three-way valve and the second two-position three-way valve, wherein when the first two-position three-way valve is in position 0, the first sample tube (102) is in fluid communication with the secondary sample injection gas path through a second port of the first two-position three-way valve to receive the gas of the secondary sample injection gas path, and when the second two-position three-way valve is in position 0, the first sample tube (102) is in fluid communication with the secondary sample injection gas path through a second port of the second two-position three-way valve to send the sample gas into the secondary sample injection gas path; and the secondary valve assembly comprises a third two-position three-way valve (101-3) and a fourth two-position three-way valve (101-4); the second sample tube (103) is arranged between the third two-position three-way valve and the fourth two-position three-way valve, wherein when the third two-position three-way valve is in position 0, the second sample tube (103) is in fluid communication with the secondary sample injection gas path through a second port of the third two-position three-way valve to receive the gas in the secondary sample injection gas path, and when the fourth two-position three-way valve is in position 0, the second sample tube (103) is in fluid communication with the secondary sample injection gas path through a second port of the fourth two-position three-way valve to send the sample gas into the secondary sample injection gas path.

15. The odor sniffing device according to claim 14, wherein, the ion migration tube comprises a first sample injection inlet (109A-1), wherein the secondary sample injection gas path sends the sample gas from the second two-position three-way valve to the first sample injection inlet of the ion migration tube, so as to conduct detection through the ion migration tube; and the ion migration tube further comprises a second sample injection inlet (109B-1), wherein the secondary sample injection gas path sends the sample gas from the fourth two-position three-way valve to a gas chromatographic column for detection, and then the sample gas is discharged from the gas chromatographic column, and is introduced into the second sample injection inlet through the secondary sample injection gas path to enter the ion migration tube for detection, wherein the secondary sampling gas path further comprises a sampling pump (110C) and a seventh two-position three-way valve, wherein the sampling pump is connected with the seventh two-position three-way valve, the seventh two-position three-way valve is connected with the first two-position three-way valve and the second two-position three-way valve through a first three-way (140-1), so that the seventh two-position three-way valve is in position 0, and the first sample tube and/or the second sample tube are allowed to be in fluid communication with the sampling pump, enabling the sampling pump to drive the sampling port to draw the sample to the first sample tube and/or the second sample tube.

16. The odor sniffing device according to claim 15, wherein the secondary gas phase detection section further comprises a fifth two-position three-way valve (101-5), and when the fifth two-position three-way valve is in position 1, a first port of the fifth two-position three-way valve (101-5) is in communication with the second port of the third two-position three-way valve, so that the gas from the ion migration tube flows through the fifth two-position three-way valve to the second port of the third two-position three-way valve, and when the fifth two-position three-way valve is in position 0, a fluid communication between the secondary sample injection gas path and the third two-position three-way valve is disconnected, wherein the secondary gas phase detection section further comprises a sixth two-position three-way valve (101-6) arranged in the secondary sample injection gas path; when the sixth two-position three-way valve is in position 1, the sixth two-position three-way valve receives the gas from the fourth two-position three-way valve and sends the gas to the gas chromatographic column through a first port of the sixth two-position three-way valve, and when the sixth two-position three-way valve (101-6) is in position 0, a gas path to the gas chromatographic column is disconnected, the gas is discharged to an outside through a second port of the sixth two-position three-way valve being in fluid communication with a filter (107-4), wherein the secondary gas phase detection section further comprises a second three-way (140-2) arranged between the sixth two-position three-way valve and the gas chromatographic column, wherein the second three-way is connected with the first port of the sixth two-position three-way valve, the gas chromatographic column and the second port of the fifth two-position three-way valve,
wherein the secondary gas phase detection section further comprises a chromatographic booster pump (110B) arranged upstream of the fifth two-position three-way valve, wherein when the fifth two-position three-way valve is in position 0, the gas is driven to enter the gas chromatographic column along the sample injection gas path and is boosted.

17. The odor sniffing device according to claim 15, wherein,
the secondary gas phase detection section further comprises an internal circulation gas path, so that at least a portion of the gas discharged from a gas outlet of the ion migration tube is sent back to a migration gas inlet of the ion migration tube by the internal circulation gas path, and the migration gas inlet is configured for the migration gas to flow into the ion migration tube;
at least a portion of the gas discharged from a gas outlet of the ion migration tube is returned to the second port of the first two-position three-way valve by a first secondary sample injection gas path branch of the secondary sample injection gas path and/or returned to the second port of the third two-position three-way valve by a second secondary sample injection gas path branch of the secondary sample injection gas path,
wherein the internal circulation gas path comprises a first buffer chamber, a second buffer chamber, and a circulating drive pump arranged between the first buffer chamber and the second buffer chamber; the first buffer chamber receives the gas discharged from the ion migration tube and absorbs a vibration caused by the gas; the gas discharged from the first buffer chamber flows to the second buffer chamber under an action of the circulating drive pump, one part of the gas discharged from the second buffer chamber circulates in the internal circulation gas path as the migration gas of the ion migration tube, and the other part of the gas discharged from the second buffer chamber enters the secondary sample injection gas path.

18. The odor sniffing device according to claim 15, wherein,
when the odor sniffing device is operated in a first detection mode, the sampling port is close to a detected target, the first two-position three-way valve and the second two-position three-way valve are in position 1, and the sample gas is collected through the sampling port and enters the first sample tube; then the first two-position three-way valve and the second two-position three-way valve are switched to position 0, and the gas in the secondary sample injection gas path drives the sample gas in the first sample tube to enter the ion migration tube for detection; or
when the odor sniffing device is operated in in a second detection mode, the sampling port is close to a detected target, the third two-position three-way valve and the fourth two-position three-way valve are in position 1, and the sample gas is collected through the sampling port and enters the second sample tube; then the third two-position three-way valve and the fourth two-position three-way valve are switched to position 0, and the gas in the secondary sample injection gas path drives the sample gas in the second sample tube into the gas chromatographic column, and then into the ion migration tube for detection; or
when the odor sniffing device is operated in a third detection mode, the sampling port is close to a detected target, the first two-position three-way valve, the second two-position three-way valve, the third two-position three-way valve, and the fourth two-position three-way valve are in position 1, and the sample gas is collected through the sampling port and enters the first sample tube and the second sample tube respectively; then the first two-position three-way valve and the second two-position three-way valve are switched to position 0, and the gas in the secondary sample injection gas path drives the sample gas of the first sample tube to enter the ion migration tube for detection to determine whether the sample gas contains a suspect substance, and if the sample gas of the first sample tube is detected by the ion migration tube as not containing a suspect substance, the third two-position three-way valve, the fourth two-position three-way valve, and the sixth two-position three-way valve are switched to position 0 to discharge the sample gas from the second sample tube; or
when the odor sniffing device is operated in a fourth detection mode, if the sample gas of the first sample tube is detected by the ion migration tube as containing a suspect substance, the sixth two-position three-way valve is switched to position 1, so that the sample gas from the second sample tube is driven into the gas chromatographic column, and then into the ion migration tube for quantitative detection,
wherein the secondary gas phase detection section is configured to present detection results on a same spectrogram based on a time difference between a detection of the sample gas by the ion migration tube and a detection of the sample by the gas chromatography column—ion migration tube, so as to comprehensively determine the detection results.

* * * * *